(12) United States Patent
Bresney et al.

(10) Patent No.: US 10,819,196 B2
(45) Date of Patent: Oct. 27, 2020

(54) ELECTRIC GENERATORS, ROTOR SLOT WEDGES FOR RETAINING FIELD COILS IN SLOTS IN ROTORS OF ELECTRIC GENERATORS, AND METHODS OF REPAIRING AND/OR MAINTAINING ELECTRIC GENERATORS AND COMPONENTS THEREOF

(71) Applicant: AGT SERVICES, INC., Amsterdam, NY (US)

(72) Inventors: Michael Bresney, Altamont, NY (US); Lawrence Jordan, Amsterdam, NY (US); Vincent Rigosu, Jr., Schenectady, NY (US); Charles Marino, Sloansville, NY (US)

(73) Assignee: AGT SERVICES, INC., Amsterdam, NY (US)

( * ) Notice: Subject to any disclaimer, the term of this patent is extended or adjusted under 35 U.S.C. 154(b) by 263 days.

(21) Appl. No.: 15/896,441

(22) Filed: Feb. 14, 2018

(65) Prior Publication Data

US 2019/0252956 A1 Aug. 15, 2019

(51) Int. Cl.
*H02K 3/487* (2006.01)
*H02K 15/00* (2006.01)
*H02K 15/02* (2006.01)

(52) U.S. Cl.
CPC ......... *H02K 15/0006* (2013.01); *H02K 3/487* (2013.01); *H02K 15/0018* (2013.01); *H02K 15/024* (2013.01); *H02K 2213/03* (2013.01)

(58) Field of Classification Search
CPC .... H02K 3/487; H02K 3/493; H02K 15/0006; H02K 15/0018; H02K 15/024; H02K 2213/03
USPC ......................................................... 310/214
See application file for complete search history.

(56) References Cited

U.S. PATENT DOCUMENTS

| | | | |
|---|---|---|---|
| 1,377,038 A | 5/1921 | Walker | |
| 2,922,058 A | 1/1960 | Bacon | |
| 3,435,263 A * | 3/1969 | Willyoung | H02K 3/24 310/61 |
| 4,363,982 A * | 12/1982 | Kaminski | H02K 3/487 310/214 |
| 4,387,316 A | 6/1983 | Katsekas | |
| 5,550,417 A | 8/1996 | Morrison et al. | |
| 6,124,659 A | 9/2000 | Rowe et al. | |
| 6,218,756 B1 | 4/2001 | Gardner et al. | |
| 6,849,972 B1 | 2/2005 | Barnes et al. | |
| 7,845,076 B2 | 12/2010 | Beckford et al. | |
| 2004/0124730 A1 | 7/2004 | Yamaguchi et al. | |

(Continued)

*Primary Examiner* — Michael Andrews
(74) *Attorney, Agent, or Firm* — Burr & Brown, PLLC

(57) ABSTRACT

A rotor assembly for an electric generator, comprising a rotor element, conductive rotor windings and a plurality of rotor slot wedges. The rotor element comprises rotor teeth and rotor slots. At least a first rotor slot wedge is in a first rotor slot and has a shape that encompasses a rectangular prismatic shape and first and second protrusions. At least a first edge on an end surface of at least a first rotor slot wedge has a degree of smoothness as specified herein, and/or is radiused (as defined herein). Also, methods of refurbishing an electric generator, comprising radiusing at least a portion of at least one edge of a wedge. Also, removing a wedge from rotor element, radiusing at least one edge of the wedge, and inserting the wedge into a rotor element.

8 Claims, 9 Drawing Sheets

(56) References Cited

U.S. PATENT DOCUMENTS

| | | |
|---|---|---|
| 2005/0284241 A1 | 12/2005 | Swartout et al. |
| 2006/0236768 A1* | 10/2006 | Bentzel ................ G01N 29/043 |
| | | 73/596 |
| 2007/0089517 A1* | 4/2007 | Bentzel .................. G10K 11/34 |
| | | 73/628 |
| 2007/0169335 A1* | 7/2007 | Matsuyama .............. B23P 6/04 |
| | | 29/596 |
| 2008/0030097 A1* | 2/2008 | Bresney ................ H02K 3/487 |
| | | 310/214 |
| 2009/0127967 A1* | 5/2009 | Tanavde ................ H02K 3/493 |
| | | 310/214 |

* cited by examiner

ELECTRIC GENERATORS, ROTOR SLOT WEDGES FOR RETAINING FIELD COILS IN SLOTS IN ROTORS OF ELECTRIC GENERATORS, AND METHODS OF REPAIRING AND/OR MAINTAINING ELECTRIC GENERATORS AND COMPONENTS THEREOF

FIELD OF THE INVENTIVE SUBJECT MATTER

The present inventive subject matter relates generally to electric generators, components for electric generators, components for repairing electric generators, components for maintaining electric generators, methods of repairing and/or maintaining electric generators and components thereof. In some aspects, the present inventive subject matter relates to wedges for slots in rotors of electric generators, e.g., wedges that retain (or assist in retaining) field coils in slots of a rotor, and/or wedges that retain (or assist in retaining) armature windings in slots of a rotor.

BACKGROUND

There exist a wide variety of electric generators, including direct current generators (dynamos) and alternating current generators (alternators). Many electric generators include a rotating rotor and a stationary stator (typically radially outside the rotor), with a magnetic field-producing component on the rotor and a power-producing component (armature) on the stator, or vice-versa (i.e., a magnetic field-producing component on the stator and a power-producing component on the rotor; that is, either the rotor produces the magnetic field and the stator is the armature, or the stator produces the magnetic field and the rotor is the armature).

In one common type of electrical generator (employed by many electric utilities), a generally cylindrical rotor is provided that has a plurality of generally radially aligned rotor teeth that have rotor tooth walls that define generally radially aligned rotor slots (i.e., each rotor slot is between a wall of one rotor tooth and a wall of an adjacent rotor tooth) in which conductive rotor windings (also known as field coils) (e.g., made of copper wire) are positioned, the rotor windings are conventionally connected to energizing and excitation circuitry through the use of electromagnetic coupling means (e.g., slip rings and carbon brushes), and the rotor provides a substantially constant magnitude, rotating electromagnetic field that is generally radially directed with respect to the generally cylindrical rotor. In this type of electrical generator, the stator typically comprises stationary bars of insulated conductive material (to form the armature) (e.g., in the form of a hollow cylindrical slotted stator core through which conductive stator windings are disposed). Because of the rotary motion of the rotor, the field lines associated with the magnetic flux are made to cross the stationary bars of insulated conductive material in the stator, thereby inducing an electrical voltage in the stator bars. Direct electrical connections to the bars in the stator provide electrical power.

Some other electric generators are similar to those generally described above, except that the magnetic field-producing component is instead on the stator and the power-producing component (armature) is instead on the rotor.

U.S. Pat. No. 2,922,058 discloses a slot wedge for retaining a winding element in a winding slot of a dynamoelectric machine core member. Referring to FIG. 1, coils 5 are retained in a slot 3 by wedges 7 provided with tapered or dovetail side faces 7a which engage similarly tapered walls 4c of the slot 4. The wedges 7 are located end-to-end the full axial length of the wedge receiving slot 4. The cross-section of the wedge 7 in the radial plane is substantially identical to but slightly smaller than the wedge slot 4 to permit ready insertion of the wedge 7. Referring to FIG. 6, when the wedge 7 is in place, an axially extending space 9 is formed between the inner surface 7b of the wedge 7, insulation 6 and slot walls 4a, 4b for receiving a spring 8; the spring 8 biases the wedge 7 outwardly so that the sloped wedge surfaces 7a are in tight frictional engagement with corresponding slot walls 4c.

U.S. Patent Application Publication No. 2004/0124730 discloses a wedge for a stator core. In FIGS. 1 and 2, a wedge 1 is fitted into a slot 50 that houses a coil arranged at an inner circumferential side of a ring-shaped stator core 5 such that the wedge closes an inner circumferential opening portion 59 of the slot 50. The slot 50 has a general portion 51 whose gap gently changes along a radial direction of the stator core 5, and a slot opening portion 52 having a drastically reduced gap at an inner circumferential end of the general portion 51. The wedge 1 has a wider portion 11 disposed in the general portion 51 of the slot 50, and a convex portion 12 arranged protrusively from the wider portion 11 and disposed in the slot opening portion 52.

BRIEF SUMMARY

In electric generators in which the magnetic field-producing component is on the rotor, rotation of the rotor (in many cases, on the order of 3600 revolutions per minute) creates centrifugal force that applies force tending to push the rotor windings outward, away from the axis of the rotor. Similarly, in electric generators in which the power-producing component is on the rotor, rotation of the rotor creates centrifugal force that applies force tending to push the armature bars outward, away from the axis of the rotor. In many types of electric generators, rotor slot wedges are used to retain (or assist in retaining) rotor windings (or armature bars) in place in the rotor slots during such rotation of the rotor (e.g., by the wedges having protrusions, at least part of which are in grooves in the rotor tooth walls)(and in many of such electric generators, one or more components, e.g., one or more insulating components (such as creepage blocks), is/are positioned between the windings and the rotor slot wedges).

In addition to centrifugal force as discussed above, gravitational force also acts on the rotor. Such centrifugal force and/or such gravitational force (especially in rotors with larger axial dimensions) can cause significant bending of the rotor. The use of multiple rotor slot wedges (arranged end-to-end) in each rotor slot, rather than a single long rotor slot wedge in each rotor slot, can help to accommodate such bending, but such bending results in the end regions of such multiple end-to-end rotor slot wedges pushing on the rotor tooth walls of the rotors and thereby creating stress concentration regions where the end regions of the rotor slot wedges press into the rotor tooth walls.

Such stress concentration regions can cause cracking in the rotor tooth walls of the electric generator, at the butt joints between adjacent rotor slot wedges. If not remedied, such cracks can grow over time, and such cracks therefore have the potential of causing catastrophic failure of rotors in such electric generators.

The forces generated by rotation (in many cases, extremely high rates of rotation) of rotors and/or force of gravity, and the relative hardness of rotor slot wedges (especially steel rotor slot wedges), contribute to (and/or cause) the cracks in the rotor tooth walls of the electric generators discussed above.

Various efforts have been made to attempt to reduce and/or address cracking in the rotor tooth walls of electric generators, including repairing cracked electric generator rotor teeth by removing damaged rotor tooth material, replacing rotor slot wedges with softer aluminum rotor slot wedges, machining away damaged rotor tooth material, replacing multiple original short steel rotor slot wedges with a single, full-length aluminum rotor slot wedge (which is more flexible than a steel rotor slot wedge of similar dimensions, and which therefore generates lower stress concentrations), etc.

U.S. Pat. No. 6,849,972, entitled "Generator Rotor Fretting Fatigue Crack Repair," the entirety of which is hereby incorporated by reference, discloses a method of repairing a crack in at least one side of a dovetail portion of a generator slot wall by (a) machining a groove at least partly along the inwardly tapered surface to remove damaged material from the slot wall; and (b) replacing the axially adjacent steel wedges. This process requires the generator rotor slot wall to be machined, which is both time-consuming and invasive.

Although use of softer aluminum can ameliorate or eliminate the cracking issues, in many cases the use of aluminum raises concerns resulting from the change in mass and/or the change in stiffness resulting from the use of aluminum (e.g., instead of steel). Attempts to change to aluminum rotor slot wedges can therefore result in uncertainty as to the effects that such changes in mass and stiffness might cause, and/or require additional costly torsional stiffness analyses and possible changes and/or repairs caused by the change, and/or the need for significant OEM involvement and/or analysis.

The present inventive subject matter provides a rotor slot wedge (that can be made of iron or of aluminum, or of any other suitable material) and that overcomes problems discussed above.

In accordance with a first aspect of the present inventive subject matter, there is provided a rotor assembly for an electric generator, the rotor assembly comprising:

a rotor element;
conductive rotor windings; and
a plurality of rotor slot wedges, including at least a first rotor slot wedge and a second rotor slot wedge,
the rotor element comprising a plurality of rotor teeth and a plurality of rotor slots, each rotor tooth having rotor tooth walls, a first rotor slot defined at least in part by at least a first rotor tooth wall of a first rotor tooth and at least a second rotor tooth wall of a second rotor tooth, the second rotor tooth adjacent to the first rotor tooth,
the first rotor slot wedge having a first rotor slot wedge shape that encompasses a first substantially rectangular prismatic shape, a first wedge first protrusion and a first wedge second protrusion,
the first rotor tooth wall comprising a first groove,
at least a portion of the first wedge first protrusion in the first groove,
the second rotor tooth wall comprising a second groove,
at least a portion of the first wedge second protrusion in the second groove,
the first substantially rectangular prismatic shape encompassing at least 80 percent of the volume within a first ideal rectangular prismatic shape, the first ideal rectangular prismatic shape encompassing at least 80 percent of the volume within the first substantially rectangular prismatic shape,
the first substantially rectangular prismatic shape comprising at least 80 percent of the volume of the first rotor slot wedge,
an entirety of the first substantially rectangular prismatic shape between a first plane and a second plane, the first plane parallel to the second plane,
an entirety of the first wedge first protrusion to a first side of the first plane, an entirety of the first wedge second protrusion and the entirety of the first substantially rectangular prismatic shape to a second side of the first plane,
the entirety of the first wedge second protrusion to a second side of the second plane, the entirety of the first wedge first protrusion and the entirety of the first substantially rectangular prismatic shape to a first side of the second plane,
the second rotor slot wedge having a second rotor slot wedge shape that comprises a second substantially rectangular prismatic shape, a second wedge first protrusion and a second wedge second protrusion,
at least a portion of the second wedge first protrusion in the first groove,
at least a portion of the second wedge second protrusion in the second groove,
the second substantially rectangular prismatic shape encompassing at least 80 percent of the volume within a second ideal rectangular prismatic shape, the second ideal rectangular prismatic shape encompassing at least 80 percent of the volume within the second substantially rectangular prismatic shape,
the second substantially rectangular prismatic shape comprising at least 80 percent of the volume of the second rotor slot wedge,
an entirety of the second substantially rectangular prismatic shape between a third plane and a fourth plane,
an entirety of the second wedge first protrusion to a first side of the third plane, an entirety of the second wedge second protrusion and the entirety of the second substantially rectangular prismatic shape to a second side of the third plane,
the entirety of the second wedge second protrusion to a second side of the fourth plane,
the entirety of the second wedge first protrusion and the entirety of the second substantially rectangular prismatic shape to a first side of the fourth plane,
the first rotor slot wedge shape comprising a first wedge first end surface and a first wedge second end surface,
the first wedge first end surface comprising a first end surface region of the first wedge first protrusion, a first end surface region of the first substantially rectangular prismatic shape and a first end surface region of the first wedge second protrusion,
the first wedge second end surface comprising a second end surface region of the first wedge first protrusion, a second end surface region of the first substantially rectangular prismatic shape and a second end surface region of the first wedge second protrusion,
the second rotor slot wedge shape comprising a second wedge first end surface and a second wedge second end surface,
the second wedge first end surface comprising a first end surface region of the second wedge first protrusion, a first end surface region of the second substantially rectangular prismatic shape and a first end surface region of the second wedge second protrusion,
the second wedge second end surface comprising a second end surface region of the second wedge first protrusion, a second end surface region of the second substantially rectangular prismatic shape and a second end surface region of the second wedge second protrusion, the first rotor slot wedge and the second rotor slot wedge in the first rotor slot and arranged end-to-end with the first wedge first end surface facing the second wedge second end surface, at least a first edge on the first wedge first end surface having a degree of smoothness (as defined in detail below) of at least 80 micrometers for an angle of 35 degrees or more.

In some embodiments in accordance with the first aspect of the present inventive subject matter, the first edge on the first wedge first end surface has a degree of smoothness selected from among:

a degree of smoothness of at least 100 micrometers for an angle of 12 degrees or more;
a degree of smoothness of at least 250 micrometers for an angle of 12 degrees or more;
a degree of smoothness of at least 500 micrometers for an angle of 12 degrees or more;
a degree of smoothness of at least 250 micrometers for an angle of 30 degrees or more;
a degree of smoothness of at least 250 micrometers for an angle of 25 degrees or more;
a degree of smoothness of at least 250 micrometers for an angle of 20 degrees or more;
a degree of smoothness of at least 250 micrometers for an angle of 15 degrees or more;
a degree of smoothness of at least 250 micrometers for an angle of 10 degrees or more;
a degree of smoothness of at least 500 micrometers for an angle of 30 degrees or more;
a degree of smoothness of at least 500 micrometers for an angle of 25 degrees or more;
a degree of smoothness of at least 500 micrometers for an angle of 20 degrees or more;
a degree of smoothness of at least 500 micrometers for an angle of 15 degrees or more; and
a degree of smoothness of at least 500 micrometers for an angle of 10 degrees or more.

In accordance with a second aspect of the present inventive subject matter, there is provided a rotor assembly for an electric generator, the rotor assembly comprising:

a rotor element;
conductive rotor windings; and
a plurality of rotor slot wedges, including at least a first rotor slot wedge and a second rotor slot wedge, the rotor element comprising a plurality of rotor teeth and a plurality of rotor slots, each rotor tooth having rotor tooth walls, a first rotor slot defined at least in part by at least a first rotor tooth wall of a first rotor tooth and at least a second rotor tooth wall of a second rotor tooth, the second rotor tooth adjacent to the first rotor tooth, the first rotor slot wedge having a first rotor slot wedge shape that encompasses a first substantially rectangular prismatic shape, a first wedge first protrusion and a first wedge second protrusion, the first rotor tooth wall comprising a first groove,
at least a portion of the first wedge first protrusion in the first groove, the second rotor tooth wall comprising a second groove,
at least a portion of the first wedge second protrusion in the second groove, the first substantially rectangular prismatic shape encompassing at least 80 percent of the volume within a first ideal rectangular prismatic shape, the first ideal rectangular prismatic shape encompassing at least 80 percent of the volume within the first substantially rectangular prismatic shape, the first substantially rectangular prismatic shape comprising at least 80 percent of the volume of the first rotor slot wedge, an entirety of the first substantially rectangular prismatic shape between a first plane and a second plane, the first plane parallel to the second plane, an entirety of the first wedge first protrusion to a first side of the first plane, an entirety of the first wedge second protrusion and the entirety of the first substantially rectangular prismatic shape to a second side of the first plane, the entirety of the first wedge second protrusion to a second side of the second plane, the entirety of the first wedge first protrusion and the entirety of the first substantially rectangular prismatic shape to a first side of the second plane, the second rotor slot wedge having a second rotor slot wedge shape that comprises a second substantially rectangular prismatic shape, a second wedge first protrusion and a second wedge second protrusion, at least a portion of the second wedge first protrusion in the first groove, at least a portion of the second wedge second protrusion in the second groove, the second substantially rectangular prismatic shape encompassing at least 80 percent of the volume within a second ideal rectangular prismatic shape, the second ideal rectangular prismatic shape encompassing at least 80 percent of the volume within the second substantially rectangular prismatic shape, the second substantially rectangular prismatic shape comprising at least 80 percent of the volume of the second rotor slot wedge, an entirety of the second substantially rectangular prismatic shape between a third plane and a fourth plane, an entirety of the second wedge first protrusion to a first side of the third plane, an entirety of the second wedge second protrusion and the entirety of the second substantially rectangular prismatic shape to a second side of the third plane, the entirety of the second wedge second protrusion to a second side of the fourth plane, the entirety of the second wedge first protrusion and the entirety of the second substantially rectangular prismatic shape to a first side of the fourth plane, the first rotor slot wedge shape comprising a first wedge first end surface and a first wedge second end surface, the first wedge first end surface comprising a first end surface region of the first wedge first protrusion, a first end surface region of the first substantially rectangular prismatic shape and a first end surface region of the first wedge second protrusion, the first wedge second end surface comprising a second end surface region of the first wedge first protrusion, a second end surface region of the first substantially rectangular prismatic shape and a second end surface region of the first wedge second protrusion, the second rotor slot wedge shape comprising a second wedge first end surface and a second wedge second end surface, the second wedge first end surface comprising a first end surface region of the second wedge first protrusion, a first end surface region of the second substantially rectangular prismatic shape and a first end surface region of the second wedge second protrusion, the second wedge second end surface comprising a second end surface region of the second wedge first protrusion, a second end surface region of the second substantially rectangular prismatic shape and a second end surface region of the second wedge second protrusion, the first rotor slot wedge and the second rotor slot wedge in the first rotor slot and arranged end-to-end with the first wedge first end surface facing the second wedge second end surface, at least a first edge on the first wedge first end surface radiused (as defined in detail below).

In some embodiments in accordance with the second aspect of the present inventive subject matter, the first edge on the first wedge first end surface has a radius of curvature in the range of:

from 1/32 inch to 1/16 inch,
from 1/16 inch to 3/32 inch,
from 3/32 inch to 1/8 inch,
from 1/8 inch to 5/32 inch,
from 5/32 inch to 3/16 inch,
from 3/16 inch to 7/32 inch,
from 7/32 inch to 1/4 inch,
from 1/4 inch to 9/32 inch,
from 9/32 inch to 5/16 inch,
from 5/16 inch to 11/32 inch,
from 11/32 inch to 3/8 inch,
from 3/8 inch to 13/32 inch,
from 13/32 inch to 7/16 inch,
from 7/16 inch to 15/32 inch, or
from 15/32 inch to 1/2 inch.

In some embodiments in accordance with any of the above-described aspects of the present inventive subject matter, which can include or not include any of the features described herein:

an entirety of the first rotor slot wedge is to a first side of a fifth plane,
an entirety of the second rotor slot wedge is to a second side of the fifth plane, and
the fifth plane is perpendicular to the first plane and perpendicular to the second plane.

In some embodiments in accordance with any of the above-described aspects of the present inventive subject matter, which can include or not include any of the features described herein:

the first substantially rectangular prismatic shape comprises:
 a first substantially rectangular prismatic shape first side,
 a first substantially rectangular prismatic shape second side,
 a first substantially rectangular prismatic shape third side,
 a first substantially rectangular prismatic shape fourth side,
 a first substantially rectangular prismatic shape fifth side, and
 a first substantially rectangular prismatic shape sixth side, the first substantially rectangular prismatic shape first side is substantially perpendicular to the first substantially rectangular prismatic shape second side,
the first substantially rectangular prismatic shape second side is substantially perpendicular to the first substantially rectangular prismatic shape third side,
the first substantially rectangular prismatic shape third side is substantially perpendicular to the first substantially rectangular prismatic shape fourth side,
the first substantially rectangular prismatic shape fourth side is substantially perpendicular to the first substantially rectangular prismatic shape first side,
the first substantially rectangular prismatic shape fifth side is substantially perpendicular to each of the first substantially rectangular prismatic shape first side, the first substantially rectangular prismatic shape second side, the first substantially rectangular prismatic shape third side, and the first substantially rectangular prismatic shape fourth side,
the first substantially rectangular prismatic shape sixth side is substantially perpendicular to each of the first substantially rectangular prismatic shape first side, the first substantially rectangular prismatic shape second side, the first substantially rectangular prismatic shape third side, and the first substantially rectangular prismatic shape fourth side,
the first substantially rectangular prismatic shape first side is substantially parallel to the first substantially rectangular prismatic shape third side,
the first substantially rectangular prismatic shape second side is substantially parallel to the first substantially rectangular prismatic shape fourth side,
the first substantially rectangular prismatic shape fifth side is substantially parallel to the first substantially rectangular prismatic shape sixth side,
the first substantially rectangular prismatic shape fifth side is substantially in the first plane,
the first substantially rectangular prismatic shape sixth side is substantially in the second plane,
the first end surface region of the first substantially rectangular prismatic shape consists of the first substantially rectangular prismatic shape first side,
the second substantially rectangular prismatic shape comprises:
 a second substantially rectangular prismatic shape first side,
 a second substantially rectangular prismatic shape second side,
 a second substantially rectangular prismatic shape third side,
 a second substantially rectangular prismatic shape fourth side,
 a second substantially rectangular prismatic shape fifth side, and
 a second substantially rectangular prismatic shape sixth side, the second substantially rectangular prismatic shape first side is substantially perpendicular to the second substantially rectangular prismatic shape second side,
the second substantially rectangular prismatic shape second side is substantially perpendicular to the second substantially rectangular prismatic shape third side,
the second substantially rectangular prismatic shape third side is substantially perpendicular to the second substantially rectangular prismatic shape fourth side,
the second substantially rectangular prismatic shape fourth side is substantially perpendicular to the second substantially rectangular prismatic shape first side,
the second substantially rectangular prismatic shape fifth side is substantially perpendicular to each of the second substantially rectangular prismatic shape first side, the second substantially rectangular prismatic shape second side, the second substantially rectangular prismatic shape third side, and the second substantially rectangular prismatic shape fourth side, the second substantially rectangular prismatic shape sixth side is substantially perpendicular to each of the second substantially rectangular prismatic shape first side, the second substantially rectangular prismatic shape second side, the second substantially rectangular prismatic shape third side, and the second substantially rectangular prismatic shape fourth side, the second substantially rectangular prismatic shape first side is substantially parallel to the second substantially rectangular prismatic shape third side, the second substantially rectangular prismatic shape second side is substantially parallel to the second substantially rectangular prismatic shape fourth side, the second substantially rectangular prismatic shape fifth side is substantially parallel to the second substantially rectangular prismatic shape sixth side, the second substantially rectangular prismatic shape fifth side is substantially in the third plane, the first substantially rectangular prismatic shape sixth side is substantially in the fourth plane, the second end surface region of the second substantially rectangular prismatic shape consists of the second substantially rectangular prismatic shape third side.

In some embodiments in accordance with any of the above-described aspects of the present inventive subject matter, which can include or not include any of the features described herein:

the first wedge first protrusion is integral with and extends from the first substantially rectangular prismatic shape fifth side, the first wedge second protrusion is integral with and extends from the first substantially rectangular prismatic shape sixth side, the second wedge first protrusion is integral with and extends from the second substantially rectangular prismatic shape fifth side, and the second wedge second protrusion is integral with and extends from the second substantially rectangular prismatic shape sixth side.

In some embodiments in accordance with any of the above-described aspects of the present inventive subject matter, which can include or not include any of the features described herein:

the entirety of the first wedge first protrusion and the entirety of the first wedge second protrusion are between [1] a sixth plane defined by at least three points on the first substantially rectangular prismatic shape second side, and [2] a seventh plane defined by at least three points on the first substantially rectangular prismatic shape fourth side, and the entirety of the second wedge first protrusion and the entirety of the second wedge second protrusion are between [1] an eighth plane defined by at least three points on the second substantially rectangular prismatic shape second side, and [2] a ninth plane defined by at least three points on the second substantially rectangular prismatic shape fourth side.

In some embodiments in accordance with any of the above-described aspects of the present inventive subject matter, which can include or not include any of the features described herein:

the first plane is identical to the third plane, and
the third plane is identical to the fourth plane.

In some embodiments in accordance with any of the above-described aspects of the present inventive subject matter, which can include or not include any of the features described herein:

the first wedge first protrusion comprises at least the first end surface region of the first wedge first protrusion, the second end surface region of the first wedge first protrusion, a first side surface of the first wedge first protrusion, a second side surface of the first wedge first protrusion, and a third side surface of the first wedge first protrusion, a first wedge first protrusion first edge extending between the first side surface of the first wedge first protrusion and the first end surface region of the first wedge first protrusion has a degree of smoothness of at least 80 micrometers for an angle of 35 degrees or more, a first wedge first protrusion second edge extending between the second side surface of the first wedge first protrusion and the first end surface region of the first wedge first protrusion has a degree of smoothness of at least 80 micrometers for an angle of 35 degrees or more, a first wedge first protrusion third edge extending between the third side surface of the first wedge first protrusion and the first end surface region of the first wedge first protrusion has a degree of smoothness of at least 80 micrometers for an angle of 35 degrees or more, a first wedge first protrusion fourth edge extending between the first side surface of the first wedge first protrusion and the second end surface region of the first wedge first protrusion has a degree of smoothness of at least 80 micrometers for an angle of 35 degrees or more, a first wedge first protrusion fifth edge extending between the second side surface of the first wedge first protrusion and the second end surface region of the first wedge first protrusion has a degree of smoothness of at least 80 micrometers for an angle of 35 degrees or more, a first wedge first protrusion sixth edge extending between the third side surface of the first wedge first protrusion and the second end surface region of the first wedge first protrusion has a degree of smoothness of at least 80 micrometers for an angle of 35 degrees or more, the first wedge second protrusion comprises at least the first end surface region of the first wedge second protrusion, the second end surface region of the first wedge second protrusion, a first side surface of the first wedge second protrusion, a second side surface of the first wedge second protrusion, and a third side surface of the first wedge second protrusion, a first wedge second protrusion first edge extending between the first side surface of the first wedge second protrusion and the first end surface region of the first wedge second protrusion has a degree of smoothness of at least 80 micrometers for an angle of 35 degrees or more, a first wedge second protrusion second edge extending between the second side surface of the first wedge second protrusion and the first end surface region of the first wedge second protrusion has a degree of smoothness of at least 80 micrometers for an angle of 35 degrees or more, a first wedge second protrusion third edge extending between the third side surface of the first wedge second protrusion and the first end surface region of the first wedge second protrusion has a degree of smoothness of at least 80 micrometers for an angle of 35 degrees or more, a first wedge second protrusion fourth edge extending between the first side surface of the first wedge second protrusion and the second end surface region of the first wedge second protrusion has a degree of smoothness of at least 80 micrometers for an angle of 35 degrees or more, a first wedge second protrusion fifth edge extending between the second side surface of the first wedge second protrusion and the second end surface region of the first wedge second protrusion has a degree of smoothness of at least 80 micrometers for an angle of 35 degrees or more, and a first wedge second protrusion sixth edge extending between the third side surface of the first wedge second protrusion and the second end surface region of the first wedge second protrusion has a degree of smoothness of at least 80 micrometers for an angle of 35 degrees or more.

In accordance with a third aspect of the present inventive subject matter, there is provided a method of refurbishing a wedge for an electric generator, comprising:

radiusing at least a first edge on a first wedge first end surface of a first wedge (and/or providing a degree of smoothness as specified herein), the first rotor slot wedge having a first rotor slot wedge shape that encompasses a first substantially rectangular prismatic shape, a first wedge first protrusion and a first wedge second protrusion, the first substantially rectangular prismatic shape encompassing at least 80 percent of the volume within a first ideal rectangular prismatic shape, the first ideal rectangular prismatic shape encompassing at least 80 percent of the volume within the first substantially rectangular prismatic shape, the first substantially rectangular prismatic shape comprising at least 80 percent of the volume of the first rotor slot wedge, an entirety of the first substantially rectangular prismatic shape between a first plane and a second plane, the first plane parallel to the second plane, an entirety of the first wedge first protrusion to a first side of the first plane, an entirety of the first wedge second protrusion and the entirety of the first substantially rectangular prismatic shape to a second side of the first plane, the entirety of the first wedge second protrusion to a second side of the second plane, the entirety of the first wedge first protrusion and the entirety of the first substantially rectangular prismatic shape to a first side of the second plane, the first rotor slot wedge shape comprising said first wedge first end surface and a first wedge second end surface, the first wedge first end surface comprising a first end surface region of the first wedge first protrusion, a first end surface region of the first substantially rectangular prismatic shape and a first end surface region of the first wedge second protrusion, the first wedge second end surface comprising a second end surface region of the first wedge first protrusion, a second end surface region of the first substantially rectangular prismatic shape and a second end surface region of the first wedge second protrusion.

In some embodiments in accordance with the third aspect of the present inventive subject matter, which can include or not include any of the features described herein, said radiusing comprises changing the first edge on the first wedge first end surface of the first wedge from an edge that is not radiused to an edge that is radiused.

In some embodiments in accordance with the third aspect of the present inventive subject matter, which can include or not include any of the features described herein, said radiusing comprises increasing a radius of curvature of the first edge on the first wedge first end surface of the first wedge.

In some embodiments in accordance with the third aspect of the present inventive subject matter, which can include or not include any of the features described herein:

said method further comprises removing said first wedge from a first rotor slot in a rotor element of a rotor assembly for an electric generator prior to said radiusing, the rotor assembly comprising:

a rotor element; and conductive rotor windings, the rotor element comprising a plurality of rotor teeth and a plurality of rotor slots, each rotor tooth having rotor tooth walls, a first rotor slot defined at least in part by at least a first rotor tooth wall of a first rotor tooth and at least a second rotor tooth wall of a second rotor tooth, the second rotor tooth adjacent to the first rotor tooth, the first rotor tooth wall comprising a first groove, the second rotor tooth wall comprising a second groove.

In some embodiments in accordance with the third aspect of the present inventive subject matter, which can include or not include any of the features described herein:

said method further comprises placing said first wedge in a rotor slot in said rotor element after said radiusing, such that:

at least a portion of the first wedge first protrusion is in the first groove, at least a portion of the first wedge second protrusion is in the second groove, the first rotor slot wedge and a second rotor slot wedge are both in the first rotor slot and are arranged end-to-end with the first wedge first end surface facing a second end surface of the second wedge, the second rotor slot wedge having a second rotor slot wedge shape that comprises a second substantially rectangular prismatic shape, a second wedge first protrusion and a second wedge second protrusion, the second rotor slot wedge shape comprising the second end surface of the second wedge and a second wedge second end surface, the second end surface of the second wedge comprising a first end surface region of the second wedge first protrusion, a first end surface region of the second substantially rectangular prismatic shape and a first end surface region of the second wedge second protrusion, the second wedge second end surface comprising a second end surface region of the second wedge first protrusion, a second end surface region of the second substantially rectangular prismatic shape and a second end surface region of the second wedge second protrusion.

at least a portion of the second wedge first protrusion in the first groove, at least a portion of the second wedge second protrusion in the second groove, the second substantially rectangular prismatic shape encompassing at least 80 percent of the volume within a second ideal rectangular prismatic shape, the second ideal rectangular prismatic shape encompassing at least 80 percent of the volume within the second substantially rectangular prismatic shape, the second substantially rectangular prismatic shape comprising at least 80 percent of the volume of the second rotor slot wedge, an entirety of the second substantially rectangular prismatic shape between a third plane and a fourth plane, an entirety of the second wedge first protrusion to a first side of the third plane, an entirety of the second wedge second protrusion and the entirety of the second substantially rectangular prismatic shape to a second side of the third plane, and the entirety of the second wedge second protrusion to a second side of the fourth plane, the entirety of the second wedge first protrusion and the entirety of the second substantially rectangular prismatic shape to a first side of the fourth plane.

In some embodiments in accordance with the third aspect of the present inventive subject matter, which can include or not include any of the features described herein:

said method further comprises placing said first wedge in a second rotor slot in a second rotor element after said radiusing, the second rotor assembly comprising:
a second rotor element; and
second conductive rotor windings, the second rotor element comprising a plurality of rotor teeth and a plurality of rotor slots, each rotor tooth having rotor tooth walls, the second rotor slot defined at least in part by at least a third rotor tooth wall of a third rotor tooth and at least a fourth rotor tooth wall of a fourth rotor tooth, the fourth rotor tooth adjacent to the third rotor tooth, the third rotor tooth wall comprising a third groove,
the fourth rotor tooth wall comprising a fourth groove.
such that:
at least a portion of the first wedge first protrusion is in the third groove,
at least a portion of the first wedge second protrusion is in the fourth groove,
the first rotor slot wedge and a second rotor slot wedge are both in the second rotor slot and are arranged end-to-end with the first wedge first end surface facing a second end surface of the second wedge,
the second rotor slot wedge having a second rotor slot wedge shape that comprises a second substantially rectangular prismatic shape, a second wedge first protrusion and a second wedge second protrusion,
the second rotor slot wedge shape comprising the second end surface of the second wedge and a second wedge second end surface,
the second end surface of the second wedge comprising a first end surface region of the second wedge first protrusion, a first end surface region of the second substantially rectangular prismatic shape and a first end surface region of the second wedge second protrusion,
the second wedge second end surface comprising a second end surface region of the second wedge first protrusion, a second end surface region of the second substantially rectangular prismatic shape and a second end surface region of the second wedge second protrusion.
at least a portion of the second wedge first protrusion in the third groove,
at least a portion of the second wedge second protrusion in the fourth groove,
the second substantially rectangular prismatic shape encompassing at least 80 percent of the volume within a second ideal rectangular prismatic shape, the second ideal rectangular prismatic shape encompassing at least 80 percent of the volume within the second substantially rectangular prismatic shape,
the second substantially rectangular prismatic shape comprising at least 80 percent of the volume of the second rotor slot wedge, an entirety of the second substantially rectangular prismatic shape between a third plane and a fourth plane, an entirety of the second wedge first protrusion to a first side of the third plane, an entirety of the second wedge second protrusion and the entirety of the second substantially rectangular prismatic shape to a second side of the third plane, and the entirety of the second wedge second protrusion to a second side of the fourth plane, the entirety of the second wedge first protrusion and the entirety of the second substantially rectangular prismatic shape to a first side of the fourth plane.

In some embodiments in accordance with the third aspect of the present inventive subject matter, which can include or not include any of the features described herein, after said radiusing, the first edge on the first wedge first end surface has a radius of curvature in a range selected from among:

from $1/32$ inch to $1/16$ inch,
from $1/16$ inch to $3/32$ inch,
from $3/32$ inch to $1/8$ inch,
from $1/8$ inch to $5/32$ inch,
from $5/32$ inch to $3/16$ inch,
from $3/16$ inch to $7/32$ inch,
from $7/32$ inch to $1/4$ inch,
from $1/4$ inch to $9/32$ inch,
from $9/32$ inch to $5/16$ inch,
from $5/16$ inch to $11/32$ inch,
from $11/32$ inch to $3/8$ inch,
from $3/8$ inch to $13/32$ inch,
from $13/32$ inch to $7/16$ inch,
from $7/16$ inch to $15/32$ inch, and
from $15/32$ inch to $1/2$ inch.

By providing a rotor slot wedge of a shape as described herein, stress exerted by one or more edges of the end surfaces of the wedges on portions of the grooves on the rotor tooth walls that such edges contact is drastically reduced.

In addition, there is a tendency, in rotors of the type described herein, for arcing to occur between adjacent rotor slot wedges (as a result of a voltage drop between wedges and a small gap existing between wedges). Where there is likewise a small gap between such adjacent wedges and the rotor (i.e., the forging), such arcing can involve the rotor as well (i.e., such that the arcing reaches the surface of the rotor), which can damage the rotor, in some cases, severely. By providing a rotor slot wedge of a shape as described herein, such arcing (i.e., arcing between adjacent rotor slot wedges) will generally not involve the rotor, because the small gap between the adjacent rotor slot wedges is spaced far enough from the rotor that any arcing does not reach the surface of the rotor, thereby avoiding damage to the rotor caused by such arcing.

The inventive subject matter may be more fully understood with reference to the accompanying drawings and the following detailed description of the inventive subject matter.

BRIEF DESCRIPTION OF THE DRAWING FIGURES

FIG. 1 is a schematic perspective view of an electric generator 10, comprising a rotor assembly 11 and a stator 12.

FIG. 2 shows a plane III-III along which cross-sectional view

FIG. 3 is a schematic cross-sectional view of the rotor assembly 11 depicted in FIG. 1.

Figure 13:
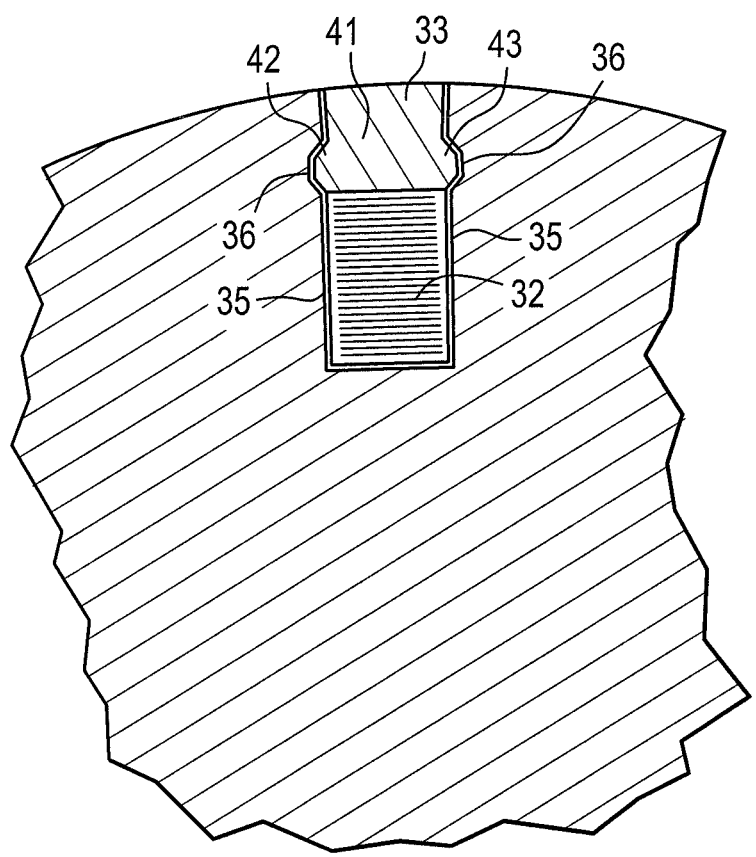

FIG. 13 is an enlarged view of a single rotor slot wedge 33 and portions of the rotor tooth walls 35 on either side of the single rotor slot wedge 33.

DETAILED DESCRIPTION

The present inventive subject matter now will be described more fully hereinafter with reference to the accompanying drawings, in which embodiments of the inventive subject matter are shown. The present inventive subject matter should not be construed as being limited to the embodiments set forth herein. Rather, these embodiments are provided so that this disclosure will be thorough and complete, and will fully convey the scope of the inventive subject matter to those skilled in the art. Like numbers refer to like elements throughout.

Relative terms, such as "top", "bottom", "side", "end", etc. are used herein to describe relationships of one surface (or element) to another surface (or element), e.g., as illustrated in the Figures. Such relative terms are intended to encompass different orientations of the device in addition to the orientation depicted in the Figures and/or as described herein. For example, if a device is turned over, a "top" surface could then be on a "bottom" side relative to other surfaces, or if a device is turned in some way other than inverting it, a "top" surface would be in some other position relative to other surfaces. The respective relative terms can therefore encompass any relative position depending on the particular orientation.

The expression "defined entirely or in part" (or "defined at least in part"), as used herein, means that the element or feature that is defined "entirely or in part" (or "at least in part") by a particular structure is defined completely by that structure or is defined by that structure in combination with one or more additional structures.

The term "adjacent," as used herein to refer to a spatial relationship between a first structure and a second structure (e.g., as in the expression "the second rotor tooth adjacent to the first rotor tooth"), as used herein, means that the first and second structures are next to each other. That is, where the structures that are described as being "adjacent" to one another are similar, no other similar structure is positioned between the first structure and the second structure (for example, where two rotor teeth are adjacent to each other, no other rotor tooth is positioned between them).

The term "plurality," as used herein, means two or more, i.e., it encompasses two, three, four, five, etc. For example, the expression "plurality of rotor slot wedges" encompasses two rotor slot wedges, three rotor slot wedges, four rotor slot wedges, etc., and similarly for "plurality of rotor teeth" and "plurality of rotor slots."

The expression "rectangular prismatic shape" is used to assist in defining the expression "substantially rectangular prismatic shape," which is used to assist in defining a shape of a portion of a wedge (namely, a wedge that has a shape that comprises a first "substantially rectangular prismatic shape," a first wedge first protrusion and a first wedge second protrusion). The expression "rectangular prismatic shape," as used herein, means an imaginary shape in the form of a cuboid, i.e., a shape that has six sides, each of which is a rectangle (any opposite pairs of which can be square), and all angles are right angles.

The expression "substantially rectangular prismatic shape" is defined in terms of its relation to a rectangular prismatic shape. In particular, a substantially rectangular prismatic shape is defined as a shape that:

[1] encompasses at least 80 percent of the volume within a first ideal rectangular prismatic shape, and

[2] at least 80 percent of which is within the first ideal rectangular prismatic shape (i.e., the first ideal rectangular prismatic shape encompasses at least 80 percent of the volume within the first substantially rectangular prismatic shape).

In order to provide a scope of shapes that encompasses shapes that wedges described herein can be, the present specification employs sequences of statements to the effect that:

[1] the wedge(s) (or the rotor slot wedge(s)) has/have a shape that encompasses [a] a substantially rectangular prismatic shape (as defined above), [b] a first protrusion and [c] a second protrusion, and

[2] the substantially rectangular prismatic shape comprises at least 80 percent of the volume of the rotor slot wedge (i.e., the combined volume of the first and second protrusions cannot exceed 20 percent of the volume of the entire rotor slot wedge).

The expression "volume" is used herein (e.g., in the definitions above) to refer to the quantity of geometric space occupied by a component (including any completely enclosed space within such component), i.e., the volumetric measurement that would be determined by (actually or figuratively) submerging the component in a liquid within a cylinder and measuring the distance that the liquid is raised (and multiplying by the interior cross-sectional area of the cylinder). "Volume" does not relate to a capacity that can be held by a component or within a component.

Thus, the wedge(s) and the rotor slot wedge(s) described herein are not limited to necessarily having surfaces that correspond exactly to surfaces of rectangular prismatic shapes (i.e, a percentage of points might not fall within the ideal rectangular prismatic shape, and/or a percentage of points within the ideal rectangular prismatic shape might not fall within the wedge or the rotor slot wedge). Such a definition thereby excludes a very large percentage of possible shapes that the wedge(s) and rotor slot wedge(s) can be.

In theory, shapes can have perfectly flat surfaces that define perfectly straight edges and that define perfectly uniform angles (e.g., right angles). In actual structures, however, deviations from such ideal shapes of course necessarily exist. For example, even if a surface appears to be flat (e.g., by ordinary eyesight), upon examining such surface more closely (e.g., with a microscope, at a nano scale or at an atomic scale), the surface is not perfectly flat.

Accordingly, since actual shapes cannot correspond exactly to ideal shapes, features of actual structures are described herein in a macroscopic sense. For example, an angle defined by two regions of respective surfaces (or of two regions of a single surface) of a structure can be described herein in a macroscopic sense by measuring the angle defined by two planes, the first plane defined by three points (each spaced from each other by at least 10 micrometers) on a region of a first surface (e.g., each point is at a vertex of an equilateral triangle whose sides measure 10 micrometers), the second plane defined by three points (likewise each spaced from each other by 10 micrometers) on a region of a second surface (or on a second region of the first surface).

The expression "edge," as used herein, refers to a region of a structure between a first region and a second region (the first region on a first surface and the second region on a second surface, or the first and second regions both on a first surface), the first region having at least three points (each spaced from each other by at least 10 micrometers) that define a first plane, the second region having at least three points (each spaced from each other by at least 10 micrometers) that define a second plane, the first plane and the second plane defining an angle of at least 70 degrees, and the first region and the second region having no region between them that has at least three points (each spaced from each other by at least 3 millimeters) that define a third plane that is substantially parallel to the first plane or the second plane (i.e., an edge does not include any flat portion that extends more than 3 mm in a direction perpendicular to the direction in which the topography of the surface changes direction), or that defines a plane that [1] defines an angle relative to the first plane that is larger than an angle that the second plane defines relative to the first plane, or [2] defines an angle relative to the second plane that is larger than the angle that the second plane defined relative to the first plane.

The expression "degree of smoothness," as used herein, refers to an objective quantitative measurement of the abruptness of topographical change in any region of an edge, i.e., a characterization of the sharpness of an edge (or a characterization of the sharpest angle in an edge) in terms of the minimum distance between first and second sub-regions of an edge that define respective planes that define an angle of at least a specified magnitude (in degrees). A degree of smoothness is recited herein in terms of at least a specified distance for an angle of at least a specified number of degrees—in other words, the direction along the surface of the edge cannot change by the specified number of degrees in a distance that is less than the specified distance. For example, a degree of smoothness of at least 80 micrometers for an angle of 35 degrees or more means that the direction along the surface of the edge cannot change by 35 degrees or more in less than a distance of 80 micrometers.

For instance, an example of a shape that has a very low degree of smoothness (as defined herein), i.e., very sharp edges, is a rectangular prismatic shape (i.e., as defined above, an ideal shape with six perfectly flat sides that each define exactly a 90 degree angle with respect to the four other sides that they abut), which could be quantified (in terms of the degree of smoothness as described herein) as having a 90 degree change in less than one micrometer, i.e., a first sub-region defined by three points on one surface define a first plane, a second sub-region defined by three points on a second surface define a second plane, the first plane and the second plane define an angle of 90 degrees with respect to each other, and the first sub-region abuts the second sub-region (i.e., a distance of less than one micrometer—theoretically a distance of zero—between the first sub-region and the second sub-region).

In determining the largest angle defined by planes defined by respective sub-regions (of the edge) that are within a specified distance, a sub-region of the edge is defined by any three points on the edge, and a plane defined by that sub-region is the plane in which all three such points are. In order for first and second sub-regions of the edge to be within the specified distance, at least one point on the first sub-region must be spaced from at least one point on the second sub-region by a distance that is less than or equal to the specified distance (e.g., if the plane defined by the first sub-region defines an angle of at least 35 degrees relative to the plane defined by the second sub-region, and a point on the first sub-region is less than 80 micrometers from a point on the second sub-region, then such edge does not satisfy the recitation "a degree of smoothness of at least 80 micrometers for an angle of 35 degrees"). The angle defined by first and second planes respectively defined by such first and second sub-regions is the angle defined by the first plane relative to the second plane (or the angle defined by the second plane relative to the first plane, which is the same).

The expression "degree of smoothness," as used herein, thus refers to an objective quantitative measurement of the abruptness of topographical change in an edge, i.e., it is also a characterization of the sharpness of an edge (or a characterization of the sharpest angle in an edge) in terms of the largest angle defined by planes defined by respective sub-regions of an edge, which sub-regions are within a specified distance to each other, i.e., that are spaced from each other by not more than a specific distance.

As noted above, the degree of smoothness of an edge is defined herein in terms of a specified minimum distance between sub-regions that define respective planes that define an angle of at least a specified magnitude (in degrees). For example, a "degree of smoothness of at least 80 micrometers for an angle of at least 35 degrees" means that any pair of respective sub-regions (each sub-region defined by three points that are spaced from each other by at least 10 micrometers) that define respective planes that define (relative to each other) an angle of at least 35 degrees must be spaced from each other by at least 80 micrometers (i.e., the point in one sub-region that is closest to a point in the other sub-region must be at least micrometers from the point in the other sub-region). Similarly, a "degree of smoothness of at least 200 micrometers for an angle of at least 45 degrees" means that any pair of respective sub-regions (each sub-region defined by three points that are spaced from each other by at least 10 micrometers) that define respective planes that define (relative to each other) an angle of at least 45 degrees must be spaced from each other by at least 200 micrometers. The meanings of other recitations of degrees of smoothness are analogous.

The expression "radius of curvature," as used herein, means the radius of at least a portion of a circle (i.e., an arc the extends at least ⅛ of a circle, i.e., an arc subtended by an angle of at least 45 degrees at the center of the circle), that most closely approximates the curvature of a curved surface (e.g., an edge). The expression "radius of curvature" is not used herein in an idealized sense to refer only to a curved surface that has a cross-section that corresponds perfectly to a portion of a circle, but instead also refers to surfaces that have cross-sections that correspond sufficiently (as defined herein) to a portion of a circle. Specifically, in order for a cross-section of a surface to be sufficiently circular to have a radius of curvature as defined herein, for each of the series of points spaced by five degrees along an arc extending at least one-eighth (i.e., 45 degrees) of a full circle, a cross-section of the surface must include at least one point that is within 0.5 mm of such point. For such a surface, the radius of curvature is a radius that is a multiple of 1/64 inch and for which the average of the distances, for each of the series of points spaced by five degrees along an arc extending along at least 45 degree of a circle of such radius, between such point and the nearest point on a cross-section of the surface (i.e., each of such "nearest point" is on a single cross-section of the surface).

The expression "radiusing" (or analogous expressions, such as "radiused") refers to actions that either [1] change an edge that does not have a radius of curvature (as "radius of curvature" is defined herein) to an edge that has a radius of curvature, or [2] change an edge that already has a radius of curvature in such a way that its radius of curvature increases by at least 1/64 inch.

For example, if a structure were provided that has a shape that corresponds closely to a rectangular prismatic shape, and then material were removed from along and adjacent to an edge of that structure (or other actions were taken that alter the edge) such that the radius of curvature (as defined above) along a cross-section of that edge became 1/16 inch, such edge would be described herein as having thus been "radiused," and such removal of material (or other action) would be described herein as "radiusing" that edge (or as "installing a radius").

The expression "substantially flat" or "substantially planar," as used herein, means that at least 90% of the points in the surface (or portion of a surface) which is characterized as being substantially flat are located on one of or between a pair of planes which are parallel and which are spaced from each other by a distance of not more than 5% of the largest dimension of the surface (or portion of a surface).

The expression "substantially parallel," as used herein in relation to two planes, means that the two planes do not diverge from each other by more than 5 degrees (i.e., for any line in a first of the planes, at least one line in the other plane diverges from such line in the first plane by not more than 5 degrees).

The expression "substantially in a plane," as used herein, e.g., in relation to a side or a surface (e.g., in the expression "the first substantially rectangular prismatic shape sixth side is substantially in the fourth plane"), as used herein, means that any two planes defined by respective trios of points (each point spaced from each other by at least 10 micrometers) in the thing being characterized as being substantially in a plane, define no angle greater than 5 degrees.

The expression "substantially perpendicular," as used herein in relation to two planes, means that a first line normal to the first plane and a second line normal to the second plane define an angle of at least 85 degrees relative to each other.

The expression "substantially the same" when referring to first and second values means that the first value is between 0.90 to 1.10 times the second value.

Unless otherwise defined, all terms (including technical and scientific terms) used herein have the same meaning as commonly understood by one of ordinary skill in the art to which this inventive subject matter belongs. It will be further understood that terms, such as those defined in commonly used dictionaries, should be interpreted as having a meaning that is consistent with their meaning in the context of the relevant art and the present disclosure and will not be interpreted in an idealized or overly formal sense unless expressly so defined herein.

As noted above, a first aspect of the present inventive subject matter is directed to a rotor assembly for an electric generator, the rotor assembly comprising a rotor element, conductive rotor windings and a plurality of rotor slot wedges. Similarly, a second aspect of the present inventive subject matter is directed to a rotor assembly for an electric generator, the rotor assembly comprising a rotor element, conductive rotor windings and a plurality of rotor slot wedges.

A rotor element in accordance with the present inventive subject matter can comprise any suitable material (e.g., steel, aluminum, and other metals or alloys). While the rotor element preferably comprises at least one substantially cylindrical section (e.g., plural cylindrical sections of different respective lengths and respective diameters), the rotor element can be of any suitable shape and size (and/or can comprises regions of any suitable shapes and sizes).

A rotor slot wedge in accordance with the present inventive subject matter can comprise any suitable material (e.g., steel, aluminum, and other metals or alloys).

The shapes and dimensions of the rotor teeth, the rotor slots, the rotor tooth walls, the grooves in the rotor tooth walls, and the rotor slot wedge(s), and regions thereof, can be of any suitable shape and dimensions.

As noted above, a third aspect of the present inventive subject matter is directed to a method of refurbishing a wedge for an electric generator, comprising radiusing at least a first edge on a first wedge first end surface of a first wedge. Such radiusing can be achieved in any suitable way, including grinding, milling, etc. Alternatively, a wedge can be formed with one or more radiused edge (i.e., the wedge as created has a radius of curvature as defined herein) (e.g., by forging or casting), or a combination of forging and/or casting in a radiused shape and grinding and/or milling can be employed.

Embodiments in accordance with the present inventive subject matter are described herein in detail in order to provide exact features of representative embodiments that are within the overall scope of the present inventive subject matter. The present inventive subject matter should be understood as not being limited to such detail. The regions illustrated in the figures are schematic in nature and their shapes are not intended to illustrate the precise shape of a region of a device and are not intended to limit the scope of the present inventive subject matter.

Figure 1:
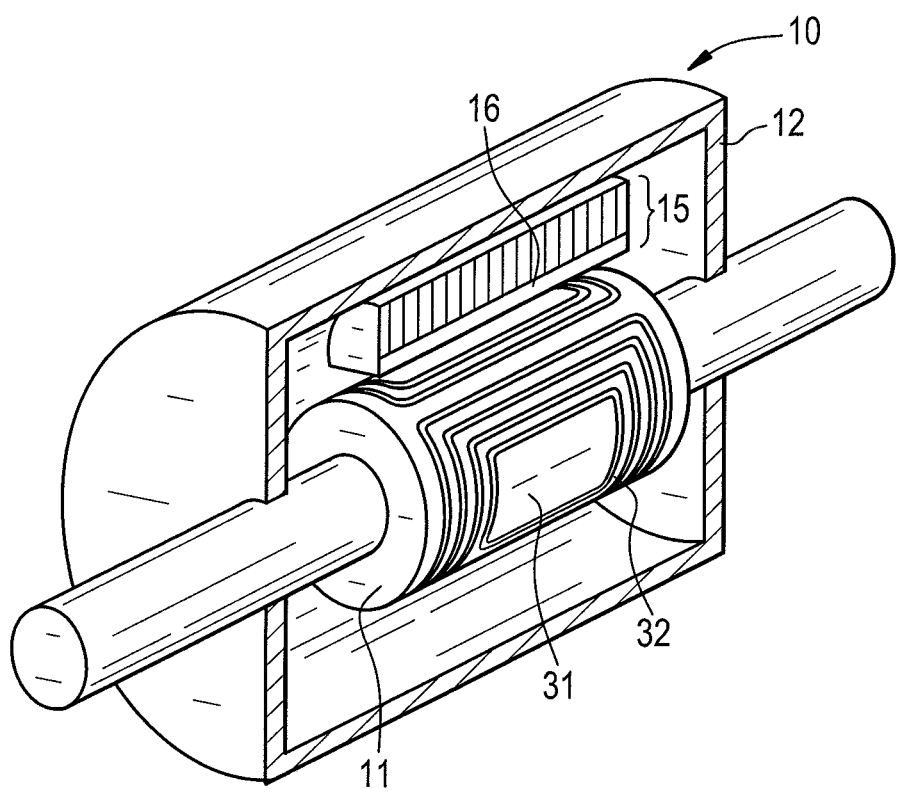

FIG. 1 is a schematic perspective view of an electric generator 10, comprising a rotor assembly 11 and a stator 12. The stator 12 comprises a stator core 15 and an armature winding 16. The rotor assembly 11 comprises a rotor element 31 and rotor windings 32.

Figure 2:
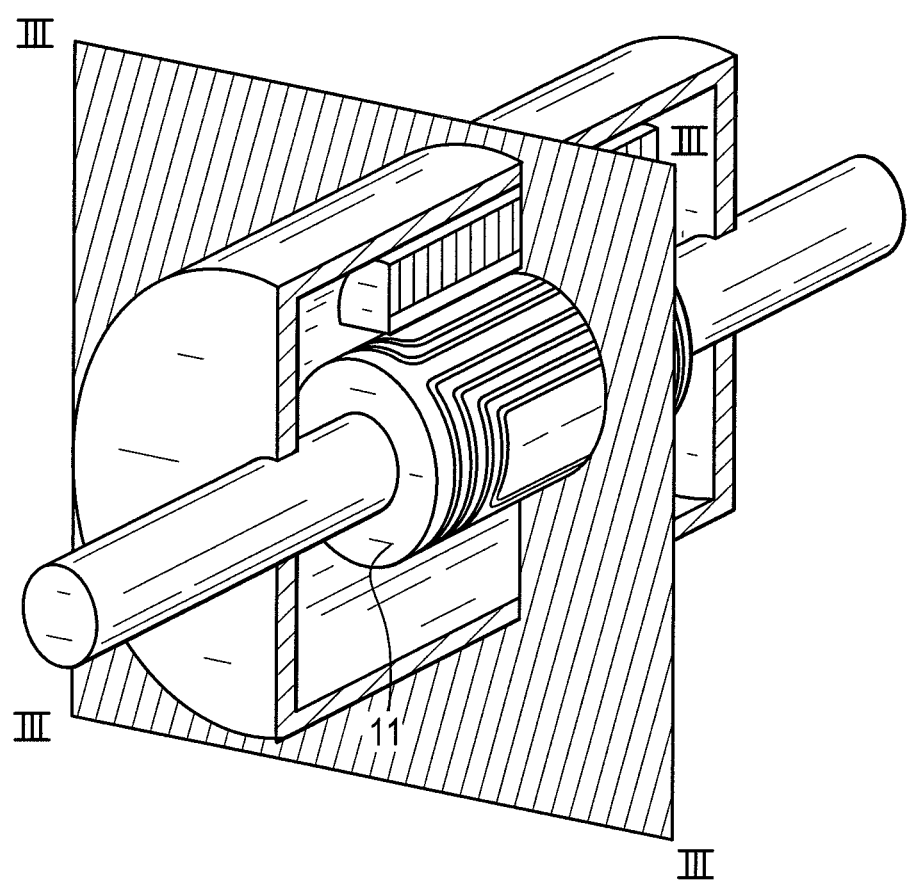
FIG. 2 is similar to FIG. 1, except
Figure 3:
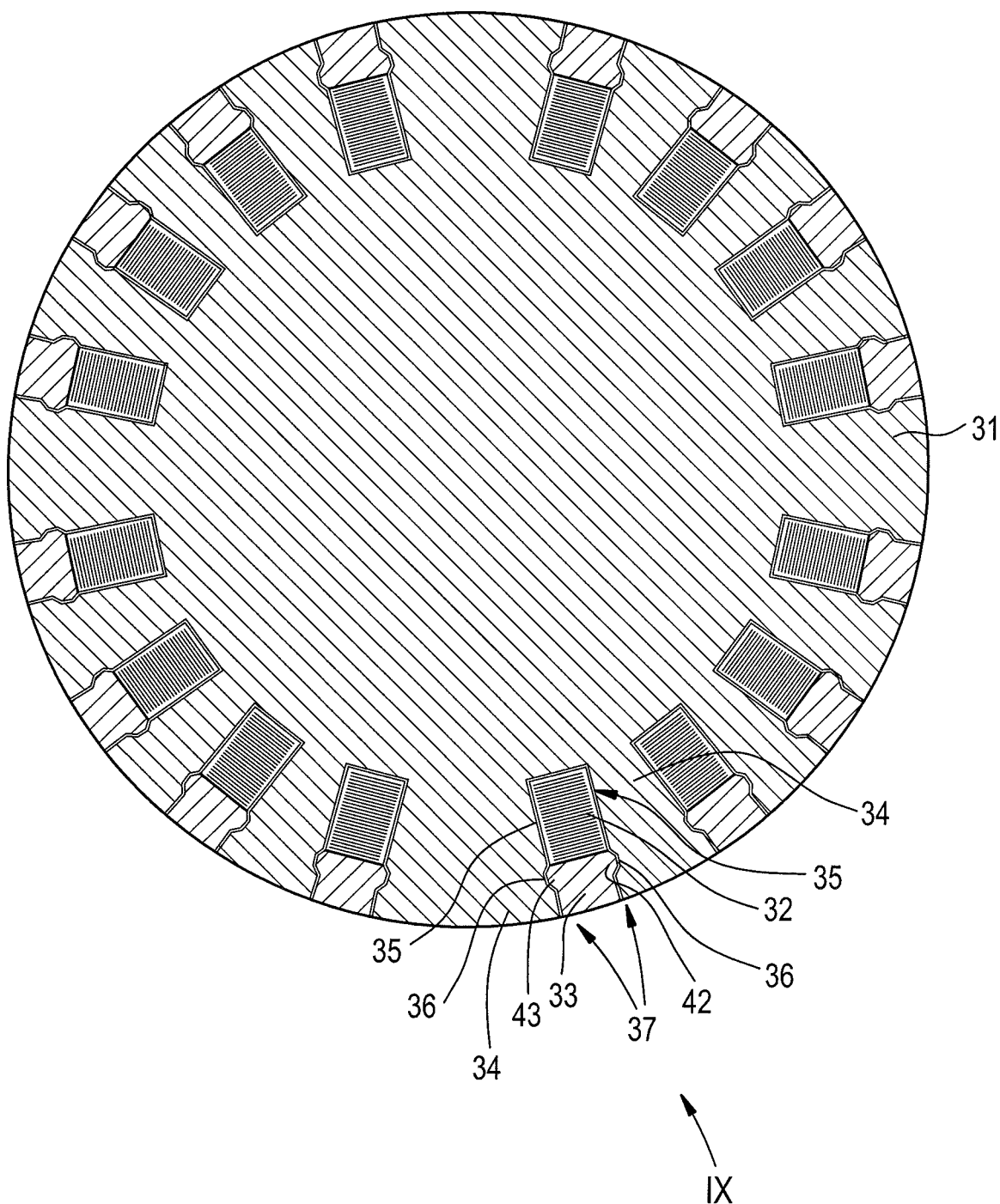
FIG. 3 is taken.

FIG. 2 is similar to FIG. 1, except FIG. 2 shows a plane along which cross-sectional view FIG. 3 is taken (FIG. 3 is a schematic cross-sectional view of the rotor assembly 11).

Referring to FIG. 3, as noted above, the rotor assembly 11 comprises a rotor element 31 and rotor windings 32; the rotor assembly 11 also comprises rotor slot wedges 33, which are shown in FIG. 3. The rotor element 31 comprises sixteen rotor teeth 34 (that each have first and second rotor tooth walls 35). Each rotor tooth wall 35 comprises a groove 36. Each rotor tooth wall 35 on each rotor tooth 34 faces a rotor tooth wall 35 of an adjacent rotor tooth 34, and each pair of rotor tooth walls 35 that face each other define a rotor slot 37. The rotor windings 32 extend within the rotor slots 37. Within each rotor slot 37 is also one of the rotor slot wedges 33. Other elements (e.g., insulating components) can be provided in one or more of the rotor slots 37. FIG. 13 is an enlarged view of a single rotor slot wedge 33 and portions of the rotor tooth walls 35 on either side of the single rotor slot wedge 33. The rotor slot 37 are the regions in the rotor element 31 that would be empty upon removal of the rotor slot wedge 33 and the rotor windings 32.

Figure 4:
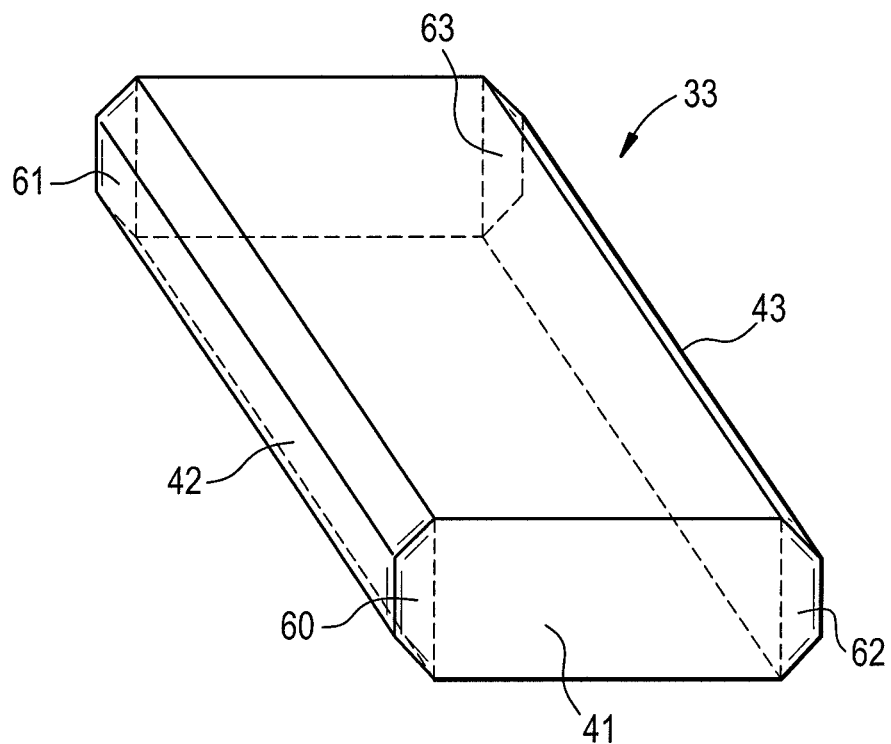
FIG. 4 is a schematic perspective view of a rotor slot wedge 33.
Figure 5:
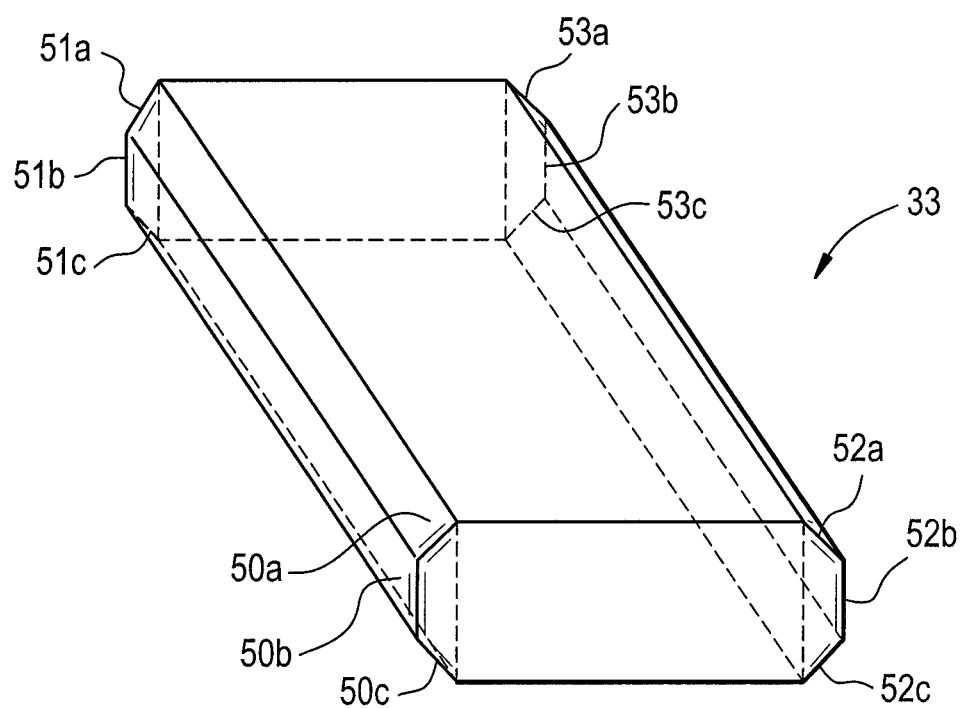
FIG. 5 is another schematic perspective view of a rotor slot wedge 33.

FIGS. 4 and 5 are schematic perspective views of one of the rotor slot wedges 33. Referring to FIG. 4, the rotor slot wedge 33 has a first rotor slot wedge shape that encompasses a first substantially rectangular prismatic shape 41 (the first substantially rectangular prismatic shape 41 is shown, by itself, conceptually, in FIG. 6), a first protrusion 42 (the first protrusion 42 is shown, by itself, conceptually, in FIG. 7) and a second protrusion 43 (the second protrusion 43 is shown, by itself, conceptually, in FIG. 8). The first substantially rectangular prismatic shape 41 comprises a first end surface first region 44, a second end surface first region 45, a first prism side 46, a second prism side 47, a top surface 48 and a bottom surface 49. The first end surface first region 44 is opposite the second end surface first region 45 with respect to the first substantially rectangular prismatic shape 41; the first prism side 46 is opposite the second prism side 47 with respect to the first substantially rectangular prismatic shape 41; and the top surface 48 is opposite the bottom surface 49 with respect to the first substantially rectangular prismatic shape 41.

Figure 6:
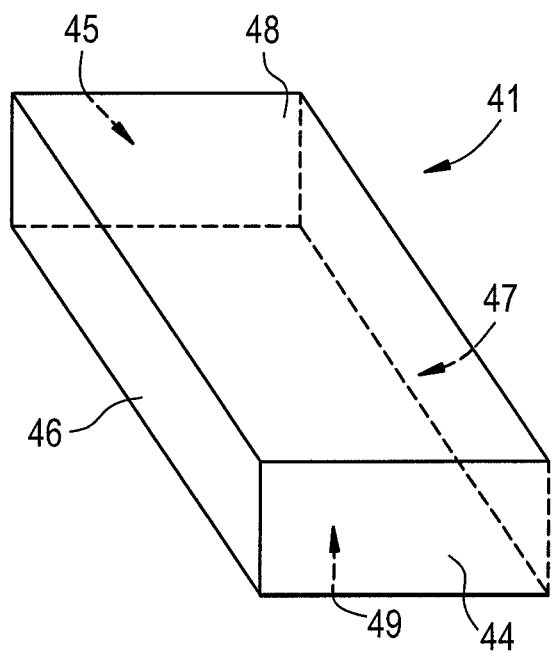
FIG. 6 is a conceptual perspective view of a first substantially rectangular prismatic shape 41.

Referring to FIG. 6, the first substantially rectangular prismatic shape 41 thus comprises:

a first substantially rectangular prismatic shape first side (the first end surface first region 44), a first substantially rectangular prismatic shape second side (the top surface 48), a first substantially rectangular prismatic shape third side (the second end surface first region 45), a first substantially rectangular prismatic shape fourth side (the bottom surface 49), a first substantially rectangular prismatic shape fifth side (the first prism side 46), and a first substantially rectangular prismatic shape sixth side (the second prism side 47), in which:

the first substantially rectangular prismatic shape first side 44 is substantially perpendicular to the first substantially rectangular prismatic shape second side 48, the first substantially rectangular prismatic shape second side 48 is substantially perpendicular to the first substantially rectangular prismatic shape third side 45, the first substantially rectangular prismatic shape third side 45 is substantially perpendicular to the first substantially rectangular prismatic shape fourth side 49, the first substantially rectangular prismatic shape fourth side 49 is substantially perpendicular to the first substantially rectangular prismatic shape first side 44, the first substantially rectangular prismatic shape fifth side 46 is substantially perpendicular to each of the first substantially rectangular prismatic shape first side 44, the first substantially rectangular prismatic shape second side 48, the first substantially rectangular prismatic shape third side 45, and the first substantially rectangular prismatic shape fourth side 49, the first substantially rectangular prismatic shape sixth side 47 is substantially perpendicular to each of the first substantially rectangular prismatic shape first side 44, the first substantially rectangular prismatic shape second side 48, the first substantially rectangular prismatic shape third side 45, and the first substantially rectangular prismatic shape fourth side 49, the first substantially rectangular prismatic shape first side 44 is substantially parallel to the first substantially rectangular prismatic shape third side 45, the first substantially rectangular prismatic shape second side 48 is substantially parallel to the first substantially rectangular prismatic shape fourth side 49, the first substantially rectangular prismatic shape fifth side 46 is substantially parallel to the first substantially rectangular prismatic shape sixth side 47, and the first end surface region of the first substantially rectangular prismatic shape consists of the first substantially rectangular prismatic shape first side 44.

Figure 10:
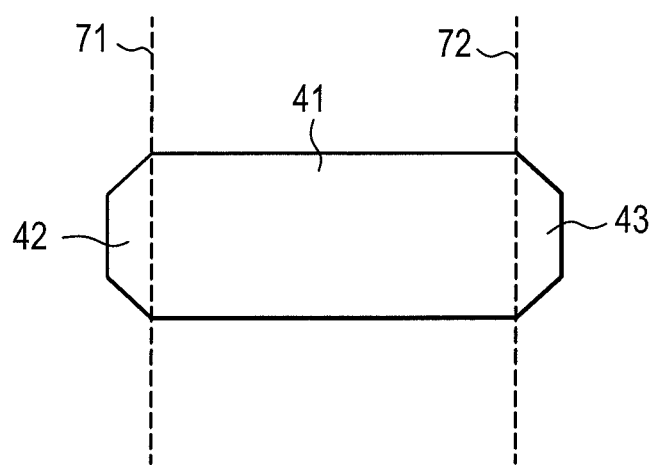
FIG. 10 is a first end view of the rotor slot wedge depicted in FIG. 4.

Referring to FIGS. 6 and 10:

the first substantially rectangular prismatic shape fifth side 46 is substantially in the first plane 71, and the first substantially rectangular prismatic shape sixth side 47 is substantially in the second plane 72.

Figure 7:
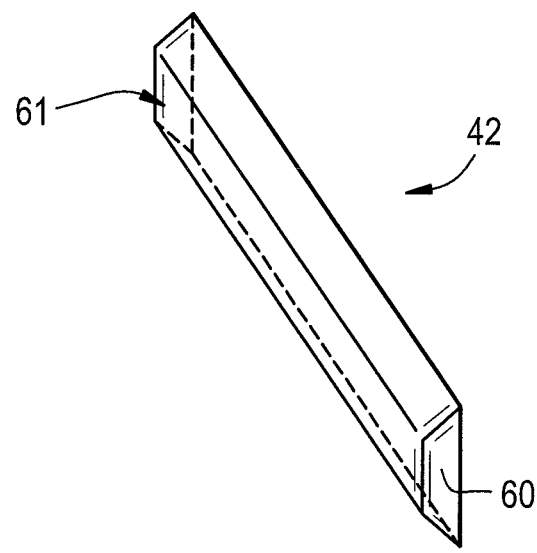
FIG. 7 is a conceptual perspective view of a first protrusion 42.
Figure 11:
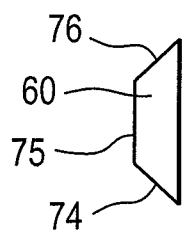
FIG. 11 is a first end view of the first protrusion 42 depicted in FIG. 7.

FIG. 11 is a first end view of the first protrusion 42 depicted in FIG. 7.

Referring to FIGS. 7 and 11, the first protrusion 42 comprises a first end surface second region 60, a second end surface second region 61, a first protrusion first side surface 74, a first protrusion second side surface 75, and a first protrusion third side surface 76.

Figure 8:
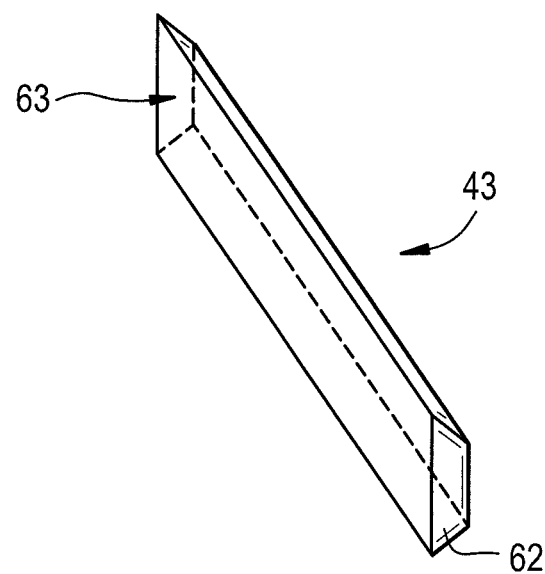
FIG. 8 is a conceptual perspective view of a second protrusion 43.
Figure 12:
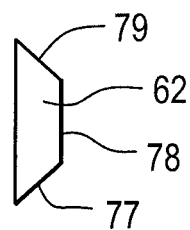
FIG. 12 is a first end view of the first protrusion 43 depicted in FIG. 8.

FIG. 12 is a first end view of the second protrusion 43 depicted in FIG. 8.

Referring to FIGS. 8 and 12, the second protrusion 43 comprises a first end surface third region 62, a second end surface third region 63, a second protrusion first side surface 77, a second protrusion second side surface 78, and a second protrusion third side surface 79.

The first protrusion 42 extends from the first prism side 46, and the second protrusion 43 extends from the second prism side 47. The first protrusion 42 comprises the first end surface second region 60 and the second end surface second region 61. The second protrusion 43 comprises the first end surface third region 62 and the second end surface third region 63. In the embodiment depicted in FIG. 4, the first protrusion 42, the first substantially rectangular prismatic shape 41 and the second protrusion 43 are a one-piece unitary structure (i.e., they are integral, i.e., the first protrusion 42 is integral with and extends from the first prism side 46 (the first substantially rectangular prismatic shape fifth side), and the first wedge second protrusion 43 is integral with and extends from the second prism side 47 (i.e., the first substantially rectangular prismatic shape sixth side)), such that no portion of the first prism side 46 of the first substantially rectangular prismatic shape 41, or the second prism side 47 of the first substantially rectangular prismatic shape 41, is exposed.

Referring to FIGS. 4 and 6, the entirety of the first wedge first protrusion 42 and the entirety of the first wedge second protrusion 43 are between [1] a sixth plane defined by at least three points on the top surface 48 (i.e., the first substantially rectangular prismatic shape second side), and [2] a seventh plane defined by at least three points on the bottom surface 49 (i.e., the first substantially rectangular prismatic shape fourth side).

A first end surface of the rotor slot wedge 33 comprises the first end surface first region 44, the first end surface second region 60 and the first end surface third region 62.

A second end surface of the rotor slot wedge 33 comprises the second end surface first region 45, the second end surface second region 61 and the second end surface third region 63.

An entirety of the first substantially rectangular prismatic shape 41 is between a first plane 71 (see FIG. 10, which is a first end view of the rotor slot wedge depicted in FIG. 4) and a second plane 72, the first plane 71 parallel to the second plane 72. An entirety of the first protrusion 42 is to a first side (the left side in the orientation of FIG. 10) of the first plane 71, an entirety of the second protrusion 43 and the entirety of the first substantially rectangular prismatic shape 41 are to a second side (the right side in the orientation of FIG. 10) of the first plane 71, the entirety of the second protrusion 43 is to a second side (the right side in the orientation of FIG. 10) of the second plane 72, and the entirety of the first protrusion 42 and the entirety of the first substantially rectangular prismatic shape 41 are to a first side (the left side in the orientation of FIG. 10) of the second plane 72.

Referring to FIG. 3, the first protrusion 42 is in a groove 36 in one rotor tooth wall 35 of one rotor tooth 34, and the second protrusion 43 is in a groove 36 in a rotor tooth wall 35 of an adjacent rotor tooth 34.

A plurality of rotor slot wedges extend end-to-end within each rotor slot. In this embodiment, each of the rotor slot wedges is configured like the rotor slot wedge 33 depicted in FIGS. 4-8 (but not necessarily identical to the rotor slot wedge 33 depicted in FIGS. 4-8 or to any other rotor slot wedge in the rotor assembly 11), i.e., each of the rotor slot wedges comprises a substantially rectangular prismatic shape, a first protrusion and a second protrusion, and has sides and surfaces analogous to those described above with respect to the rotor slot wedge 33 depicted in FIGS. 4-8. Features of rotor slot wedges other than the rotor slot wedge 33 depicted in FIGS. 4-8 that are analogous to features of the rotor slot wedge 33 depicted in FIGS. 4-8 are referred to herein with like terminology and/or like reference numbers (even though, as mentioned above, they are not necessarily identical in shape and/or other characteristics).

Figure 9:
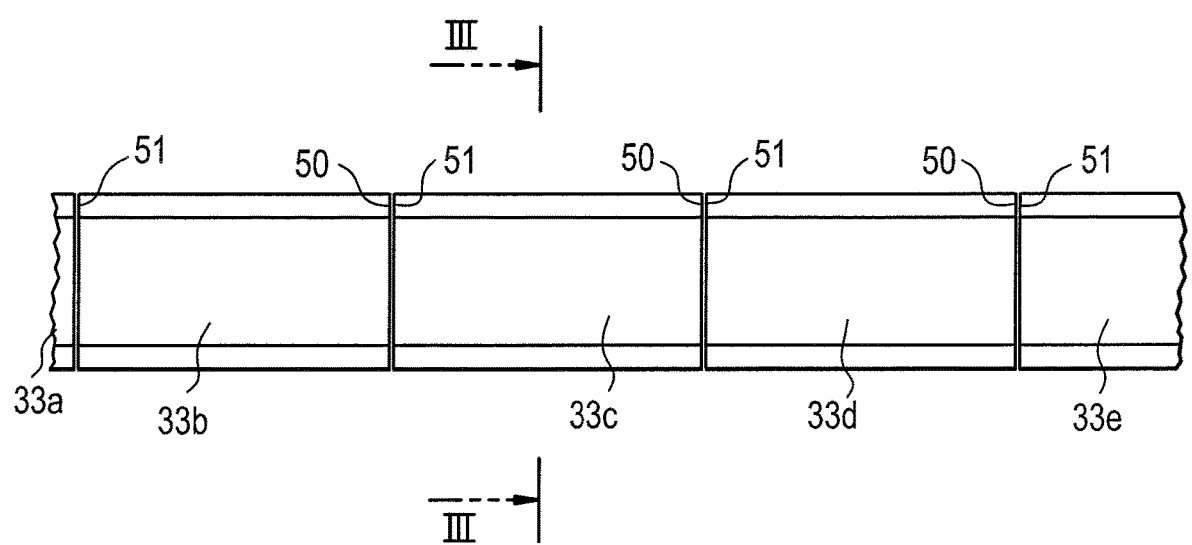
FIG. 9 is a perspective view, taken in the direction of the arrow IX shown in FIG. 3, of one row of rotor slot wedges (with the adjacent rotor teeth removed, so that the protrusions 42 and 43 are visible).

FIG. 9 is a perspective view, taken in the direction of the arrow IX shown in FIG. 3, of one row of rotor slot wedges (including at least rotor slot wedges 33a, 33b, 33c, 33d and 33e) in a single rotor slot, with the adjacent rotor teeth removed, so that the protrusions 42 and 43 are visible. The sectional view depicted in FIG. 3 cuts through the rotor slot wedge 33c depicted in FIG. 9, so that (at least) one part of the rotor slot wedge 33c, the rotor slot wedge 33b and the rotor slot wedge 33a extend out of the page of FIG. 3 toward the viewer (i.e., out of the plane depicted in FIG. 3), and (at least) the other part of the rotor slot wedge 33c, the rotor slot wedge 33d and the rotor slot wedge 33e extend into the page of FIG. 3 away from the viewer (i.e., into the plane depicted in FIG. 3). The respective end surfaces of the rotor slot wedges face adjacent rotor slot wedges, i.e., a first end surface of the rotor slot wedge 33c faces a second end surface of the adjacent rotor slot wedge 33b, a first end surface of the rotor slot wedge 33b faces a second end surface of the rotor slot wedge 33a, the second end surface of the rotor slot wedge 33c faces a first end surface of the rotor slot wedge 33d, and a second end surface of the rotor slot wedge 33d faces a first end surface of the rotor slot wedge 33e.

An entirety of the rotor slot wedge 33c is to a first side (the right side in the orientation depicted in FIG. 9) of a fifth plane 73, and an entirety of the rotor slot wedge 33b is to a second side (the left side in the orientation depicted in FIG. 9) of the fifth plane 73, and the fifth plane 73 is perpendicular to the first plane 71 and perpendicular to the second plane 72.

In the embodiment depicted in FIGS. 4-8, a volume of the first substantially rectangular prismatic shape 41 comprises about 87.5% of a volume of the first rotor slot wedge shape.

Referring now to FIG. 5, the first protrusion 42 comprises a first protrusion first edge 50a, a first protrusion second edge 50b, a first protrusion third edge 50c, a first protrusion fourth edge 51a, a first protrusion fifth edge 51b and a first protrusion sixth edge 51c. The first protrusion first edge 50a, the first protrusion second edge 50b, and the first protrusion third edge 50c are each along the first end surface of the first rotor slot wedge 33. The first protrusion fourth edge 51a, the first protrusion fifth edge 51b and the first protrusion sixth edge 51c are each along the second end surface of the first rotor slot wedge 33.

The second protrusion 43 comprises a second protrusion first edge 52a, a second protrusion second edge 52b, a second protrusion third edge 52c, a second protrusion fourth edge 53a, a second protrusion fifth edge 53b, and a second protrusion sixth edge 53c. The second protrusion first edge 52a, the second protrusion second edge 52b and the second protrusion third edge 52c are each along the first end surface of the first rotor slot wedge 33. The second protrusion fourth edge 53a, the second protrusion fifth edge 53b and the second protrusion sixth edge 53c are each along the second end surface of the first rotor slot wedge 33.

Any one or more of the first protrusion first edge 50a, the first protrusion second edge 50b, the first protrusion third edge 50c, the first protrusion fourth edge 51a, the first protrusion fifth edge 51b, the first protrusion sixth edge 51c, the second protrusion first edge 52a, the second protrusion second edge 52b, the second protrusion third edge 52c, the second protrusion fourth edge 53a, the second protrusion fifth edge 53b, and/or the second protrusion sixth edge 53c is radiused and/or has a specified degree of smoothness. In some embodiments, any one or more of such edges has a radius of curvature of at least $1/32$ inch, at least $1/16$ inch, at least $3/32$ inch, at least $1/8$ inch, at least $5/32$ inch, at least $3/16$ inch, at least $7/32$ inch, at least $1/4$ inch, at least $9/32$ inch, at least $5/16$ inch, at least $11/32$ inch, at least $3/8$ inch, at least $13/32$ inch, at least $7/16$ inch, at least $15/32$ inch, at least $1/2$ inch, etc., e.g., the first protrusion first edge 50a has a radius of curvature in the range of from $1/32$ inch to $1/16$ inch, from $1/16$ inch to $3/32$ inch, from $3/32$ inch to $1/8$ inch, from $1/8$ inch to $5/32$ inch, from $5/32$ inch to $3/16$ inch, from $3/16$ inch to $7/32$ inch, from $7/32$ inch to $1/4$ inch, from $1/4$ inch to $9/32$ inch, from $9/32$ inch to $5/16$ inch, from $5/16$ inch to $11/32$ inch, from $11/32$ inch to $3/8$ inch, from $3/8$ inch to $13/32$ inch, from $13/32$ inch to $7/16$ inch, from $7/16$ inch to $15/32$ inch, from $15/32$ inch to $1/2$ inch, as well as any combination of the above ranges, e.g., from $3/32$ inch to $9/32$ inch. In some embodiments, any one or more of such edges has a degree of smoothness selected from among:

a degree of smoothness of at least 80 micrometers for an angle of 35 degrees or more;

a degree of smoothness of at least 100 micrometers for an angle of 12 degrees or more;

a degree of smoothness of at least 250 micrometers for an angle of 12 degrees or more;

a degree of smoothness of at least 500 micrometers for an angle of 12 degrees or more;

a degree of smoothness of at least 250 micrometers for an angle of 30 degrees or more;

a degree of smoothness of at least 250 micrometers for an angle of 25 degrees or more;

a degree of smoothness of at least 250 micrometers for an angle of 20 degrees or more;

a degree of smoothness of at least 250 micrometers for an angle of 15 degrees or more;

a degree of smoothness of at least 250 micrometers for an angle of 10 degrees or more;

a degree of smoothness of at least 500 micrometers for an angle of 30 degrees or more;

a degree of smoothness of at least 500 micrometers for an angle of 25 degrees or more;
a degree of smoothness of at least 500 micrometers for an angle of 20 degrees or more;
a degree of smoothness of at least 500 micrometers for an angle of 15 degrees or more; and
a degree of smoothness of at least 500 micrometers for an angle of 10 degrees or more The first protrusion first edge 50a, first protrusion second edge 50b, the first protrusion third edge 50c, the first protrusion fourth edge 51a, the first protrusion fifth edge 51b, the first protrusion sixth edge 51c, the second protrusion first edge 52a, the second protrusion second edge 52b, the second protrusion third edge 52c, the second protrusion fourth edge 53a, the second protrusion fifth edge 53b, and the second protrusion sixth edge 53c can each be radiused, and/or can each have a degree of smoothness as specified above, and/or can each have a radius of curvature corresponding to any of the minimum radii of curvature or ranges of radius of curvature specified above with respect to the first protrusion first edge 50a. Any one or combination of the first protrusion first edge 50a, the first protrusion second edge 50b, the first protrusion third edge 50c, the first protrusion fourth edge 51a, the first protrusion fifth edge 51b, the first protrusion sixth edge 51c, the second protrusion first edge 52a, the second protrusion second edge 52b, the second protrusion third edge 52c, the second protrusion fourth edge 53a, the second protrusion fifth edge 53b, and the second protrusion sixth edge 53c can be radiused, and each can have any suitable radius of curvature and/or degree of smoothness (i.e., each can be different, some can be similar, or all can be similar, etc., i.e., each can be independently selected from among the minimums and ranges set forth above).

From the vantage-point depicted in FIG. 9, the first protrusion 42 and the second protrusion 43 of each wedge are visible, as are (for each wedge) the first protrusion first edge 50a, the first protrusion second edge 50b, the first protrusion fourth edge 51a, the first protrusion fifth edge 51b, the second protrusion first edge 52a, the second protrusion second edge 52b, the second protrusion fourth edge 53a, and the second protrusion fifth edge 53b (i.e., the first protrusion third edge 50c, the first protrusion sixth edge 51c, the second protrusion third edge 52c and the second protrusion sixth edge 53c are toward the bottom regions of the respective protrusions (in the orientation depicted in FIG. 4), and so they would not be visible from above, as in the view depicted in FIG. 9). FIG. 9 reflects that each of the first protrusion first edge 50a, the first protrusion second edge 50b, the first protrusion fourth edge 51a, the first protrusion fifth edge 51b, the second protrusion first edge 52a, the second protrusion second edge 52b, the second protrusion fourth edge 53a, and the second protrusion fifth edge 53b are radiused. These edges, if not radiused, would tend to press into (or cut into) the rotor tooth walls 35 (and/or press into or cut into to a greater degree), particularly upon any bending of the rotor element 31.

In the embodiment depicted in FIG. 4, an entirety of the first protrusion 42 is within a space which [1] extends from the first prism side 46 away from the first substantially rectangular prismatic shape 41, and [2] is defined at least in part by the first prism side 46, a plane defined by the first end surface first region 44, a plane defined by the second end surface first region 45, a plane defined by the top surface 48, a plane defined by the bottom surface 49 and a plane which is parallel to and spaced from (to the left in FIG. 4) the first prism side 46.

By providing a rotor slot wedge 33 of a shape as described above, the stress exerted by any of the first through sixth edges of either of the protrusion edges (i.e., the first protrusion first edge 50a, the first protrusion second edge 50b, the first protrusion third edge 50c, the first protrusion fourth edge 51a, the first protrusion fifth edge 51b, the first protrusion sixth edge 51c, the second protrusion first edge 52a, the second protrusion second edge 52b, the second protrusion third edge 52c, the second protrusion fourth edge 53a, the second protrusion fifth edge 53b, and/or the second protrusion sixth edge 53c) on the portions of the grooves 36 on the rotor tooth walls 35 that the respective edges (i.e., 50a, 50b, 50c, 51a, 51b, 51c, 52a, 52b, 52c, 53a, 53b and 53c) contact is drastically reduced. For comparison, radiusing any of such edges (i.e., any of the first protrusion first edge 50a, the first protrusion second edge 50b, the first protrusion third edge 50c, the first protrusion fourth edge 51a, the first protrusion fifth edge 51b, the first protrusion sixth edge 51c, the second protrusion first edge 52a, the second protrusion second edge 52b, the second protrusion third edge 52c, the second protrusion fourth edge 53a, the second protrusion fifth edge 53b, and the second protrusion sixth edge 53c) to a radius of curvature of at least $3/16$ inch reduces von Mises stresses at the point of contact with the groove 36 by 50% in comparison to if such edges were radiused to only $1/32$ inch.

In addition, there is a tendency, in rotors of the type described herein, for arcing to occur between adjacent rotor slot wedges (as a result of a voltage drop between wedges and a small gap existing between wedges). Where there is likewise a small gap between such adjacent wedges and the rotor (i.e., the forging), such arcing can involve the rotor as well (i.e., such that the arcing reaches the surface of the rotor), which can damage the rotor, in some cases, severely. By providing a rotor slot wedge 33 of a shape as described above, in which one or more of the edges described above (i.e., one or more of the first protrusion first edge 50a, the first protrusion second edge 50b, the first protrusion third edge 50c, the first protrusion fourth edge 51a, the first protrusion fifth edge 51b, the first protrusion sixth edge 51c, the second protrusion first edge 52a, the second protrusion second edge 52b, the second protrusion third edge 52c, the second protrusion fourth edge 53a, the second protrusion fifth edge 53b, and the second protrusion sixth edge 53c) are radiused to a radius of curvature as specified above, and/or have a degree of smoothness as specified above, such arcing (i.e., arcing between adjacent rotor slot wedges) will generally not involve the rotor, because the small gap between the adjacent rotor slot wedges is spaced far enough from the rotor that any arcing does not reach the surface of the rotor, thereby avoiding damage to the rotor caused by such arcing.

While certain embodiments of the present inventive subject matter have been illustrated with reference to specific combinations of elements, various other combinations may also be provided without departing from the teachings of the present inventive subject matter. Thus, the present inventive subject matter should not be construed as being limited to the particular exemplary embodiments described herein and illustrated in the Figures, but may also encompass combinations of elements of the various illustrated embodiments.

Many alterations and modifications may be made by those having ordinary skill in the art, given the benefit of the present disclosure, without departing from the spirit and scope of the inventive subject matter. Therefore, it must be understood that the illustrated embodiments have been set forth only for the purposes of example, and that it should not be taken as limiting the inventive subject matter as defined by the following claims. The following claims are, therefore, to be read to include not only the combination of elements which are literally set forth but all equivalent elements for performing substantially the same function in substantially the same way to obtain substantially the same result. The claims are thus to be understood to include what is specifically illustrated and described above, what is conceptually equivalent, and also what incorporates the essential idea of the inventive subject matter.

Any two or more structural parts of the assemblies or elements described herein can be integrated. Any structural part of the assemblies or elements described herein can be provided in two or more parts (which may be held together in any known way, e.g., with adhesive, screws, bolts, rivets, staples, etc.). Similarly, any two or more functions can be conducted simultaneously, and/or any function can be conducted in a series of steps.

The invention claimed is:

1. A rotor assembly for an electric generator, the rotor assembly comprising:
a rotor element;
conductive rotor windings; and
a plurality of rotor slot wedges, including at least a first rotor slot wedge and a second rotor slot wedge,
the rotor element comprising a plurality of rotor teeth and a plurality of rotor slots, each rotor tooth having rotor tooth walls, a first rotor slot defined at least in part by at least a first rotor tooth wall of a first rotor tooth and at least a second rotor tooth wall of a second rotor tooth, the second rotor tooth adjacent to the first rotor tooth,
the first rotor slot wedge having a first rotor slot wedge shape that encompasses a first substantially rectangular prismatic shape, a first wedge first protrusion and a first wedge second protrusion,
the first rotor tooth wall comprising a first groove,
at least a portion of the first wedge first protrusion in the first groove,
the second rotor tooth wall comprising a second groove,
at least a portion of the first wedge second protrusion in the second groove,
the first substantially rectangular prismatic shape encompassing at least 80 percent of the volume within a first ideal rectangular prismatic shape, the first ideal rectangular prismatic shape encompassing at least 80 percent of the volume within the first substantially rectangular prismatic shape,
the first substantially rectangular prismatic shape comprising at least 80 percent of the volume of the first rotor slot wedge,
an entirety of the first substantially rectangular prismatic shape between a first plane and a second plane, the first plane parallel to the second plane,
an entirety of the first wedge first protrusion to a first side of the first plane, an entirety of the first wedge second protrusion and the entirety of the first substantially rectangular prismatic shape to a second side of the first plane,
the entirety of the first wedge second protrusion to a second side of the second plane, the entirety of the first wedge first protrusion and the entirety of the first substantially rectangular prismatic shape to a first side of the second plane,
the second rotor slot wedge having a second rotor slot wedge shape that comprises a second substantially rectangular prismatic shape, a second wedge first protrusion and a second wedge second protrusion,
at least a portion of the second wedge first protrusion in the first groove,
at least a portion of the second wedge second protrusion in the second groove,
the second substantially rectangular prismatic shape encompassing at least 80 percent of the volume within a second ideal rectangular prismatic shape, the second ideal rectangular prismatic shape encompassing at least 80 percent of the volume within the second substantially rectangular prismatic shape,
the second substantially rectangular prismatic shape comprising at least 80 percent of the volume of the second rotor slot wedge,
an entirety of the second substantially rectangular prismatic shape between a third plane and a fourth plane,
an entirety of the second wedge first protrusion to a first side of the third plane, an entirety of the second wedge second protrusion and the entirety of the second substantially rectangular prismatic shape to a second side of the third plane,
the entirety of the second wedge second protrusion to a second side of the fourth plane, the entirety of the second wedge first protrusion and the entirety of the second substantially rectangular prismatic shape to a first side of the fourth plane,
the first rotor slot wedge shape comprising a first wedge first end surface and a first wedge second end surface,
the first wedge first end surface comprising a first end surface region of the first wedge first protrusion, a first end surface region of the first substantially rectangular prismatic shape and a first end surface region of the first wedge second protrusion,
the first wedge second end surface comprising a second end surface region of the first wedge first protrusion, a second end surface region of the first substantially rectangular prismatic shape and a second end surface region of the first wedge second protrusion,
the second rotor slot wedge shape comprising a second wedge first end surface and a second wedge second end surface,
the second wedge first end surface comprising a first end surface region of the second wedge first protrusion, a first end surface region of the second substantially rectangular prismatic shape and a first end surface region of the second wedge second protrusion,
the second wedge second end surface comprising a second end surface region of the second wedge first protrusion, a second end surface region of the second substantially rectangular prismatic shape and a second end surface region of the second wedge second protrusion,
the first rotor slot wedge and the second rotor slot wedge in the first rotor slot and arranged end-to-end with the first wedge first end surface facing the second wedge second end surface,
at least a first edge on the first wedge first end surface having a degree of smoothness perpendicular to the edge of at least 80 micrometers for an angle of 35 degrees or more.

2. A rotor assembly as recited in claim 1, wherein:
an entirety of the first rotor slot wedge is to a first side of a fifth plane,
an entirety of the second rotor slot wedge is to a second side of the fifth plane, and
the fifth plane is perpendicular to the first plane and perpendicular to the second plane.

3. A rotor assembly as recited in claim 1, wherein:
the first substantially rectangular prismatic shape comprises:
  a first substantially rectangular prismatic shape first side,
  a first substantially rectangular prismatic shape second side,
  a first substantially rectangular prismatic shape third side,
  a first substantially rectangular prismatic shape fourth side,
  a first substantially rectangular prismatic shape fifth side, and
  a first substantially rectangular prismatic shape sixth side,
the first substantially rectangular prismatic shape first side is substantially perpendicular to the first substantially rectangular prismatic shape second side,
the first substantially rectangular prismatic shape second side is substantially perpendicular to the first substantially rectangular prismatic shape third side,
the first substantially rectangular prismatic shape third side is substantially perpendicular to the first substantially rectangular prismatic shape fourth side,
the first substantially rectangular prismatic shape fourth side is substantially perpendicular to the first substantially rectangular prismatic shape first side,
the first substantially rectangular prismatic shape fifth side is substantially perpendicular to each of the first substantially rectangular prismatic shape first side, the first substantially rectangular prismatic shape second side, the first substantially rectangular prismatic shape third side, and the first substantially rectangular prismatic shape fourth side,
the first substantially rectangular prismatic shape sixth side is substantially perpendicular to each of the first substantially rectangular prismatic shape first side, the first substantially rectangular prismatic shape second side, the first substantially rectangular prismatic shape third side, and the first substantially rectangular prismatic shape fourth side,
the first substantially rectangular prismatic shape first side is substantially parallel to the first substantially rectangular prismatic shape third side,
the first substantially rectangular prismatic shape second side is substantially parallel to the first substantially rectangular prismatic shape fourth side,
the first substantially rectangular prismatic shape fifth side is substantially parallel to the first substantially rectangular prismatic shape sixth side,
the first substantially rectangular prismatic shape fifth side is substantially in the first plane,
the first substantially rectangular prismatic shape sixth side is substantially in the second plane,
the first end surface region of the first substantially rectangular prismatic shape consists of the first substantially rectangular prismatic shape first side,
the second substantially rectangular prismatic shape comprises:
  a second substantially rectangular prismatic shape first side,
  a second substantially rectangular prismatic shape second side,
  a second substantially rectangular prismatic shape third side,
  a second substantially rectangular prismatic shape fourth side,
  a second substantially rectangular prismatic shape fifth side, and
  a second substantially rectangular prismatic shape sixth side,
the second substantially rectangular prismatic shape first side is substantially perpendicular to the second substantially rectangular prismatic shape second side,
the second substantially rectangular prismatic shape second side is substantially perpendicular to the second substantially rectangular prismatic shape third side,
the second substantially rectangular prismatic shape third side is substantially perpendicular to the second substantially rectangular prismatic shape fourth side,
the second substantially rectangular prismatic shape fourth side is substantially perpendicular to the second substantially rectangular prismatic shape first side,
the second substantially rectangular prismatic shape fifth side is substantially perpendicular to each of the second substantially rectangular prismatic shape first side, the second substantially rectangular prismatic shape second side, the second substantially rectangular prismatic shape third side, and the second substantially rectangular prismatic shape fourth side,
the second substantially rectangular prismatic shape sixth side is substantially perpendicular to each of the second substantially rectangular prismatic shape first side, the second substantially rectangular prismatic shape second side, the second substantially rectangular prismatic shape third side, and the second substantially rectangular prismatic shape fourth side,
the second substantially rectangular prismatic shape first side is substantially parallel to the second substantially rectangular prismatic shape third side,
the second substantially rectangular prismatic shape second side is substantially parallel to the second substantially rectangular prismatic shape fourth side,
the second substantially rectangular prismatic shape fifth side is substantially parallel to the second substantially rectangular prismatic shape sixth side,
the second substantially rectangular prismatic shape fifth side is substantially in the third plane,
the first substantially rectangular prismatic shape sixth side is substantially in the fourth plane,
the second end surface region of the second substantially rectangular prismatic shape consists of the second substantially rectangular prismatic shape third side.

4. A rotor assembly as recited in claim 3, wherein:
the first wedge first protrusion is integral with and extends from the first substantially rectangular prismatic shape fifth side,
the first wedge second protrusion is integral with and extends from the first substantially rectangular prismatic shape sixth side,
the second wedge first protrusion is integral with and extends from the second substantially rectangular prismatic shape fifth side, and
the second wedge second protrusion is integral with and extends from the second substantially rectangular prismatic shape sixth side.

5. A rotor assembly as recited in claim 4, wherein:
the entirety of the first wedge first protrusion and the entirety of the first wedge second protrusion are between [1] a sixth plane defined by at least three points on the first substantially rectangular prismatic shape second side, and [2] a seventh plane defined by at least three points on the first substantially rectangular prismatic shape fourth side, and the entirety of the second wedge first protrusion and the entirety of the second wedge second protrusion are between [1] an eighth plane defined by at least three points on the second substantially rectangular prismatic shape second side, and [2] a ninth plane defined by at least three points on the second substantially rectangular prismatic shape fourth side.

6. A rotor assembly as recited in claim 1, wherein:
the first plane is identical to the third plane, and
the second plane is identical to the fourth plane.

7. A rotor assembly as recited in claim 1, wherein:
the first wedge first protrusion comprises at least the first end surface region of the first wedge first protrusion, the second end surface region of the first wedge first protrusion, a first side surface of the first wedge first protrusion, a second side surface of the first wedge first protrusion, and a third side surface of the first wedge first protrusion,
a first wedge first protrusion first edge extending between the first side surface of the first wedge first protrusion and the first end surface region of the first wedge first protrusion has a degree of smoothness of at least 80 micrometers for an angle of 35 degrees or more,
a first wedge first protrusion second edge extending between the second side surface of the first wedge first protrusion and the first end surface region of the first wedge first protrusion has a degree of smoothness of at least 80 micrometers for an angle of 35 degrees or more,
a first wedge first protrusion third edge extending between the third side surface of the first wedge first protrusion and the first end surface region of the first wedge first protrusion has a degree of smoothness of at least 80 micrometers for an angle of 35 degrees or more,
a first wedge first protrusion fourth edge extending between the first side surface of the first wedge first protrusion and the second end surface region of the first wedge first protrusion has a degree of smoothness of at least 80 micrometers for an angle of 35 degrees or more,
a first wedge first protrusion fifth edge extending between the second side surface of the first wedge first protrusion and the second end surface region of the first wedge first protrusion has a degree of smoothness of at least 80 micrometers for an angle of 35 degrees or more,
a first wedge first protrusion sixth edge extending between the third side surface of the first wedge first protrusion and the second end surface region of the first wedge first protrusion has a degree of smoothness of at least 80 micrometers for an angle of 35 degrees or more,
the first wedge second protrusion comprises at least the first end surface region of the first wedge second protrusion, the second end surface region of the first wedge second protrusion, a first side surface of the first wedge second protrusion, a second side surface of the first wedge second protrusion, and a third side surface of the first wedge second protrusion,
a first wedge second protrusion first edge extending between the first side surface of the first wedge second protrusion and the first end surface region of the first wedge second protrusion has a degree of smoothness of at least 80 micrometers for an angle of 35 degrees or more,
a first wedge second protrusion second edge extending between the second side surface of the first wedge second protrusion and the first end surface region of the first wedge second protrusion has a degree of smoothness of at least 80 micrometers for an angle of 35 degrees or more,
a first wedge second protrusion third edge extending between the third side surface of the first wedge second protrusion and the first end surface region of the first wedge second protrusion has a degree of smoothness of at least 80 micrometers for an angle of 35 degrees or more,
a first wedge second protrusion fourth edge extending between the first side surface of the first wedge second protrusion and the second end surface region of the first wedge second protrusion has a degree of smoothness of at least 80 micrometers for an angle of 35 degrees or more,
a first wedge second protrusion fifth edge extending between the second side surface of the first wedge second protrusion and the second end surface region of the first wedge second protrusion has a degree of smoothness of at least 80 micrometers for an angle of 35 degrees or more, and
a first wedge second protrusion sixth edge extending between the third side surface of the first wedge second protrusion and the second end surface region of the first wedge second protrusion has a degree of smoothness of at least 80 micrometers for an angle of 35 degrees or more.

8. A rotor assembly as recited in claim 1, wherein the first edge on the first wedge first end surface has a degree of smoothness selected from among:
a degree of smoothness of at least 100 micrometers for an angle of 12 degrees or more;
a degree of smoothness of at least 250 micrometers for an angle of 12 degrees or more;
a degree of smoothness of at least 500 micrometers for an angle of 12 degrees or more;
a degree of smoothness of at least 250 micrometers for an angle of 30 degrees or more;
a degree of smoothness of at least 250 micrometers for an angle of 25 degrees or more;
a degree of smoothness of at least 250 micrometers for an angle of 20 degrees or more;
a degree of smoothness of at least 250 micrometers for an angle of 15 degrees or more;
a degree of smoothness of at least 250 micrometers for an angle of 10 degrees or more;
a degree of smoothness of at least 500 micrometers for an angle of 30 degrees or more;
a degree of smoothness of at least 500 micrometers for an angle of 25 degrees or more;
a degree of smoothness of at least 500 micrometers for an angle of 20 degrees or more;
a degree of smoothness of at least 500 micrometers for an angle of 15 degrees or more; and
a degree of smoothness of at least 500 micrometers for an angle of 10 degrees or more.

* * * * *